United States Patent [19]

Young et al.

[11] Patent Number: 4,694,395
[45] Date of Patent: Sep. 15, 1987

[54] SYSTEM FOR PERFORMING VIRTUAL LOOK-AHEAD MEMORY OPERATIONS

[75] Inventors: Rocky M. Young, Escondido; Tri T. Vo, San Diego, both of Calif.

[73] Assignee: NCR Corporation, Dayton, Ohio

[21] Appl. No.: 801,361

[22] Filed: Nov. 25, 1985

[51] Int. Cl.⁴ .............................................. G06F 12/10
[52] U.S. Cl. ................................................... 364/200
[58] Field of Search ... 364/200 MS File, 900 MS File

[56]  References Cited
U.S. PATENT DOCUMENTS

| | | | |
|---|---|---|---|
| 3,854,126 | 12/1974 | Gray et al. | 364/200 |
| 4,084,227 | 4/1978 | Bennett et al. | 364/200 |
| 4,340,932 | 7/1982 | Bakuler et al. | 364/200 |
| 4,403,283 | 9/1983 | Myntti et al. | 364/200 |
| 4,513,371 | 4/1985 | Celio | 364/200 |

Primary Examiner—Eddie P. Chan
Attorney, Agent, or Firm—Wilbert Hawk, Jr.; Edward Dugas

[57] ABSTRACT

A system is disclosed which reduces the cycle time required for performing virtual look-ahead memory operations in computer systems employing random access memory and paging. In a preferred embodiment of the invention, a processor (CPU) outputs a desired virtual address to an address translation unit (ATU) and to a memory output control unit (MOC) and also outputs processor signals to the ATU and to a memory state generator (MSG). The virtual address is comprised of a first real address and a second virtual address. During a first cycle this first real address is gated through a memory output control unit (MOC) to cause an addressable memory, which is arranged to store data in a page format, to commence memory addressing prior to the completion of translation by the ATU. During the first cycle the ATU translates the second virtual address into second and third real address portions. During a second cycle a decoder decodes the third real address portion to develop memory operation signals which determine which one of a plurality of virtual memory operations is to be performed. The MSG is responsive to these memory operation signals and to the processor signals for developing a set of state signals which determines the type of memory operation that is to be performed, as well as the number of cycles required to perform that operation. Under the control of the set of state signals from the MSG, a memory timing control circuit (MTC) controls the MOC to develop memory control signals and to gate the second real address from the ATU and the memory control signals to the addressable memory to access the data in a reduced cycle time for the desired virtual memory operation. The system has the capability of also performing a plurality of real memory operations.

7 Claims, 15 Drawing Figures

TABLE

NUMBER OF CYCLES REQUIRED TO PERFORM:

|  | PRIOR ART | PRESENT INVENTION |
|---|---|---|
| REAL FETCH | 3 | 3 |
| VIRTUAL FETCH | 4 | 3 |
| REAL FULL STORE | 2 | 2 |
| VIRTUAL FULL STORE | 3 | 3 |
| REAL PARTIAL STORE | 4 | 4 |
| VIRTUAL PARTIAL STORE | 5 | 4 |

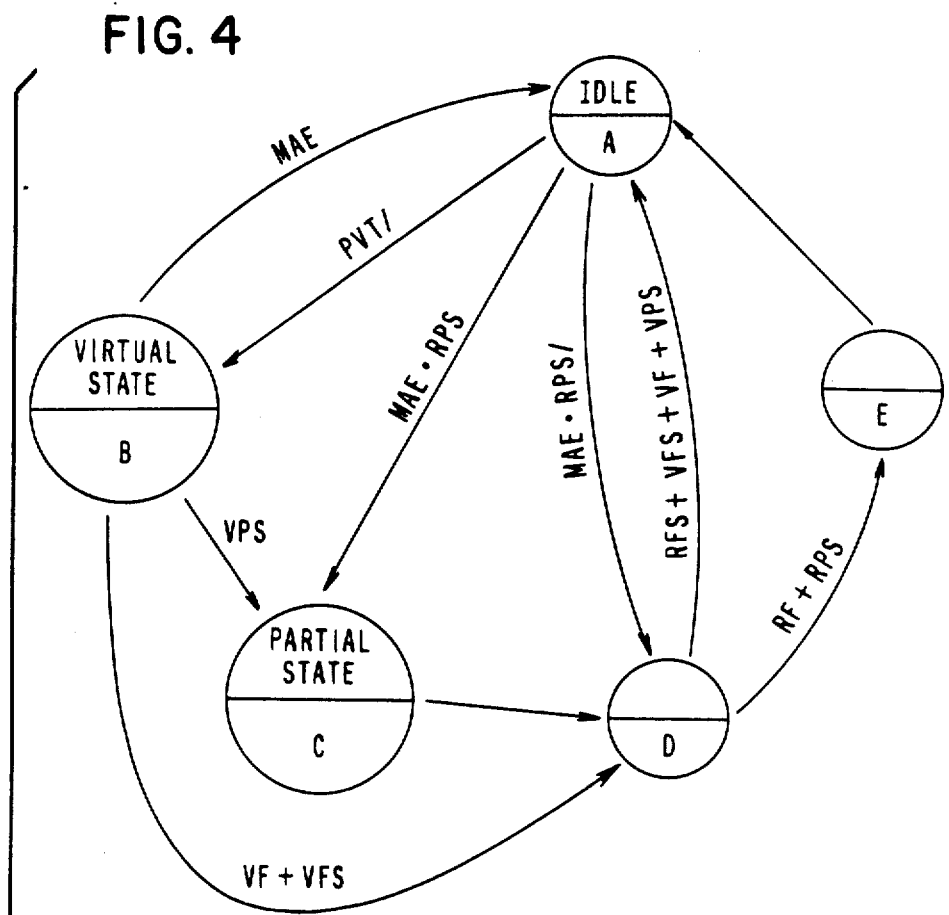

FIG. 10    2-CYCLE REAL FULL STORE

SYSTEM FOR PERFORMING VIRTUAL LOOK-AHEAD MEMORY OPERATIONS

BACKGROUND OF THE INVENTION

1. Field of the Invention

This invention relates to digital computer systems and more particularly to a system for the faster performance of virtual look-ahead memory operations.

2. Description of the Prior Art

Virtual memory operations in most computers are done in two parts. First, a translation process is required to translate each virtual address into a corresponding real address and, second, the required memory operation is performed with this translated address. As a result, the total time required for a virtual memory operation is typically equal to the sum of the translation time of the virtual address and the time that it takes to perform the actual memory operation.

To reduce this total time to perform a virtual memory operation, an improved address translation apparatus for translating virtual addresses into real addresses was proposed, as described in the U.S. Pat. No. 4,513,371 of John A. Celio, which patent is assigned to NCR Corporation, the assignee of the present invention.

FIGS. 1 and 2 of the drawings, respectively, illustrate a block diagram of the apparatus of the above-noted U.S. Pat. No. 4,513,371 and a functional diagram of how the various components of a virtual address are utilized in that patent during an address translation. As shown in FIG. 1, a 32-bit processor-memory bus 21 interconnects a processor element 23, an address translation element 25 and a memory interface element 27. The processor element 23 generates a virtual address and the address translation element 25 converts the virtual address to a real address. The memory interface element 27 supplies timing control signals and memory address inputs to a memory or DRAM (dynamic random access memory) array 29 to access data during fetch and store operations. The apparatus of FIG. 1 allocates its virtual memory into pages of information. As a result, a first portion of the virtual address from the processor element 23 is used to indicate the "displacement" (FIG. 2) or relative address within each page, while a second portion of the virtual address is used to indicate the "virtual page number" (FIG. 2) within the virtual memory of the apparatus of FIG. 1.

The virtual page number portion is derived from the most significant bits of the virtual address, while the displacement portion is derived from the least significant bits of the virtual address. The virtual page number portion is applied to the address translation element 25 for an address translation into a second portion of a real address. The displacement portion is actually a first portion of the real address and therefore requires no address translation. As a result, this displacement portion of the real address is applied to the memory interface element 27 to enable the element 27 to start the RAS (row address strobe) access portion of the real memory access of the DRAM 29. Upon completion of the address translation of the virtual page number portion, the translated remaining portion of the real address is applied to the memory interface element 27 which then generates signals to complete the CAS (column address strobe) access portion of the real memory access of the DRAM 29.

Thus, the apparatus of U.S. Pat. No. 4,513,371 decreases the virtual memory access time by minimizing the address translation time. Such minimization of the address translation time is the result of not translating virtual address bits that are also real address bits and of commencing memory access by using the available real address bits as soon as they become available. The time saved by such a decreased access time is equal to the RAS to CAS minimum delay requirement for the particular DRAM that is employed in the apparatus.

SUMMARY OF THE INVENTION

Briefly, a system is disclosed for performing faster virtual look-ahead memory operations.

In accordance with one aspect of the invention, there is provided a data processing system comprising a memory bus; processing means coupled to said memory bus for providing during a first cycle either a real address for a real memory operation or a first virtual address for a virtual memory operation, said real address including first, second and third real addresses, said first virtual address including said first real address and a second virtual address, said processing means further selectively providing first and second processor signals as a function of a desired one of a plurality of real and virtual memory operations to be performed by the data processing system; address translation means coupled to said memory bus being responsive to said first processor signal for translating said second virtual address into said second and third real addresses and for forwarding said second and third real addresses to said memory bus during at least a second cycle; decoding means coupled to said memory bus for converting said third real address into memory operation signals that determine which one of said plurality of memory operations is to be performed by the data processing system; a memory state generator selectively responsive to said first and second processor signals and to said memory operation signals for selectively generating an associated predetermined set of state signals that determine the number of cycles required to perform a desired one of said plurality of real and virtual memory operations; memory timing control means responsive to said set of state signals for selectively generating a set of control signals; memory output control means selectively responsive to addresses on said memory bus and to said set of control signals from said memory timing control means for selectively outputting memory control signals and said first and second real addresses to initiate the selected one of said plurality of real and virtual memory operations; an addressable memory being selectively responsive to said set of control signals and said first and second real addresses for accessing desired data during the cycle time of the memory operation that is determined by said set of control signals; and output means coupled to said addressable memory and to said memory bus for passing accessed data therebetween.

In accordance with a second aspect of the invention, there is provided in a data processing system which decreases the access time to an addressable memory when virtual addressing is used and wherein the addressable memory contains pages of stored data addressable through real addresses, and wherein said data processing system includes: a memory bus; at least one bank of addressable memory for storing pages of addressable data; processing means coupled to the memory bus for providing during a first cycle a virtual address consisting of high and low order bits wherein the low order bits form a first real memory address and the high order bits are translatable to translated real addresses; address translation means coupled to the memory bus for translating the provided virtual address into a plurality of translated real addresses and for forwarding the translated real addresses to the memory bus during at least a second cycle; and a memory interface which includes a memory output control unit, the memory output control unit including first means for storing the first real memory address present on the memory bus during the first cycle, second means for storing a first translated real address present on the memory bus during the second cycle, third means for storing a second translated real address present on the memory bus during the second cycle, and multiplexer means coupled to the first and second means for alternately gating to the addressable memory the first real address during the first cycle to commence memory addressing prior to the completion of the translation by the address translation means and the first translated real address during the second cycle to complete the memory addressing, an improvement in the memory interface comprising: a first decoder coupled to the third means for converting a portion of the second translated real address into memory operation signals that determine which one of a plurality of virtual memory operations is to be performed by the data processing system; a memory state generator selectively responsive to a set of processor signals from the processing means and to said memory operation signals for selectively generating an associated predetermined set of state signals that determine the number of cycles required to perform a desired virtual memory operation; memory timing control means responsive to said set of state signals for selectively generating a set of control signals, the addressable memory being selectively responsive to said set of control signals and to the first real memory address and the first translated real address for accessing the desired data during the cycle time of the desired virtual memory operation that is determined by said set of control signals; and output means coupled to the addressable memory and the memory bus for passing accessed data therebetween.

BRIEF DESCRIPTION OF THE DRAWINGS

Various objects, features and advantages of the invention, as well as the invention itself, will become more apparent to those skilled in the art in the light of the following detailed description taken in consideration with the accompanying drawings wherein like reference numbers indicate like or corresponding parts throughout the several views and wherein:

FIG. 4 illustrates a state diagram for the memory operations used in the preferred embodiment of FIG. 3;

DESCRIPTION OF THE PREFERRED EMBODIMENT

It should be noted at this time that, throughout this description of the preferred embodiment, the presence of a slash (/) following either a symbol or an acronym represents the logical inversion of that symbol or acronym.

Figure 3:
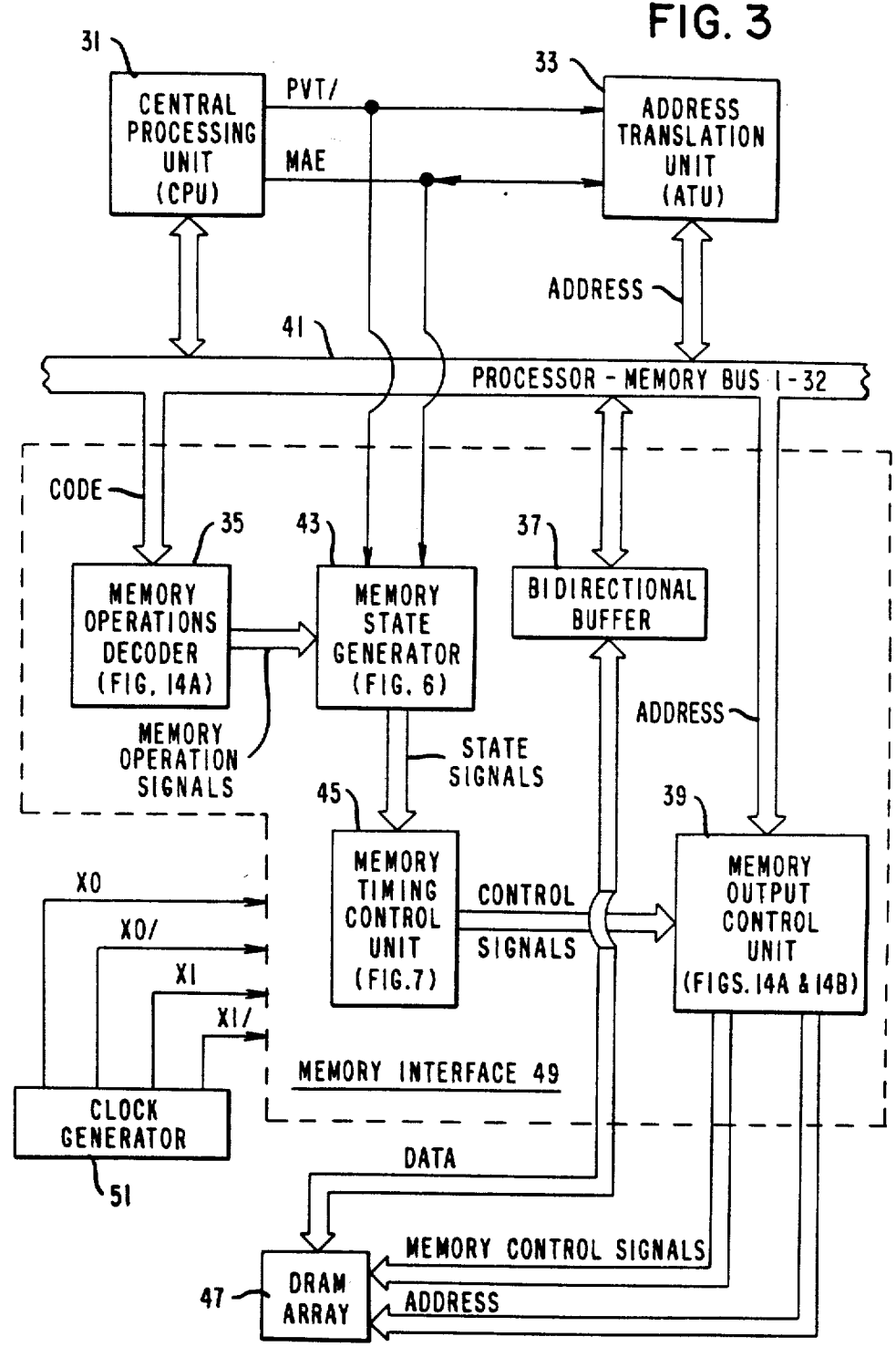
FIG. 3 is a schematic block diagram of a preferred embodiment of the invention.

Referring now to FIG. 3, a schematic block diagram of the system of the invention is shown. The system is comprised of a central processing unit (CPU) 31, an address translation unit (ATU) 33, a memory operations decoder 35, a bidirectional buffer circuit 37 and a memory output control unit 39 interconnected by way of a 32-bit processor-memory (PM) bus 41, a memory state generator 43 coupled between the memory operations decoder 35 and a memory timing control unit 45 which is coupled to the memory output control unit 39, and a memory or dynamic random access memory (DRAM) array 47 which is coupled to the memory output control unit 39. The bidirectional buffer 37 may be comprised of a "data in" buffer (not shown) and a "data out" buffer (not shown). The elements 35, 37, 39, 43 and 45 are included in a memory interface circuit 49. A free-running clock generator 51 outputs X0 and X1 clocks and their negations X0/ and X1/ to control the timing operation of the system of FIG. 3. The clocks X0 and X1 have the same frequency but are interlaced in time, as shown in FIGS. 8-13.

There are basically six memory operations that can be performed by the system of FIG. 3. There are three real memory operations comprised of; real fetch, real full store, and real partial store, and three virtual memory operations comprised of; virtual fetch, virtual full store, and virtual partial store. Each memory operation (to be discussed) requires an associated preselected number of cycles of operation to be performed, with one X0 clock and one X1 clock (and their negations) occurring during each cycle of operation.

The CPU 31 performs three jobs with respect to the six memory operations performed by the system. Firstly, during clock X0 of the first cycle of a memory operation, CPU 31 sends out a CODE for a particular type of memory operation and the memory address (either a real address for a real memory operation or a virtual address for a virtual memory operation). This CODE is sent to the memory operations decoder 35 via bus 41 and will call for a fetch, full store or partial store operation. To distinguish a real memory operation from a virtual memory operation, the CPU 33 also develops and applies to both the ATU 33 and the memory state generator 43 either a memory address enable (MAE) signal or a processor virtual transfer (PVT/) signal. The MAE signal tells the units 33 and 43 that a real memory operation (real fetch, real full store or real partial store) is to be performed, whereas the PVT/ signal tells the units 33 and 43 that a virtual memory operation (virtual fetch, virtual full store or virtual partial store) is to be performed. Secondly, if a store memory operation is to be performed, the CPU 31 will send out data during clock X1 of the first cycle of that memory operation.

Thirdly, if a fetch memory operation is to be performed, the CPU 31 will receive data from the DRAM array 47 during clock X1 of the third cycle of that memory operation.

The ATU 33 is mainly utilized for address translation. During the X0 clock of the first cycle of a virtual memory operation, the ATU 33 receives the virtual address from the CPU 31 via the PM bus 41. The ATU 33 translates that virtual address into a real address during the X1 clock of the first cycle. During the X0 clock of the second cycle, the ATU 33 sends an MAE signal to the memory state generator 43 and the translated virtual address, which is now the memory real address, to the memory output control unit 39.

The memory operations decoder 35 is responsive to the code from the CPU 31 for developing memory operation signals which determine whether a fetch, a full store or a partial store memory operation is to be performed.

Upon receiving the PVT/ or MAE signal from the CPU 31 and the required memory operation signal (or signals) from the memory operations decoder 35, the memory state generator 43 will determine how many cycles are needed to perform the desired memory operation and will also step through a predetermined sequence of operational states during the determined cycles so that the desired memory operation can be performed. As the memory state generator 43 steps through its states, it develops an associated set of state signals during each state. So the memory state generator 43 essentially generates the cycles and determines the operational states needed to perform the desired memory operation. At least two cycles, but no more than four cycles, are needed to perform any given one of the six different memory operations discussed above.

It should be noted at this time that the memory state generator 43 is a key element in this invention. By utilizing a memory state generator 43 to generate a preselected sequence of operational states, the system of FIG. 3 can make use of the time saved from the RAS to CAS minimum delay requirement of the particular DRAM being used, as taught in U.S. Pat. No. 4,513,371, to decrease by one the number of cycles needed to perform each of the virtual fetch and virtual store memory operations. This operational feature, as well as others, will be discussed in more detail later.

Memory timing control unit 45 is responsive to the sets of state signals, developed by the memory state generator 43 as it steps through its states, for generating control signals to control the memory output control unit 39.

Memory Output Control Unit 39 is responsive to the address signals from the PM bus 41 and to the control signals from the memory timing control unit 45 for buffering and gating memory control signals and addresses to the DRAM array 47 to initiate the various memory operations.

The DRAM array 47 can be comprised of eight conventional memory banks (not shown), with each memory bank storing 64K bits of memory. Each of these memory banks may be a Texas Instruments 4164 type RAM which has 256 rows and 256 columns to form 64,536 memory cells. The eight RAMs are operated in parallel so that the DRAM array 47 can store 64,536 bytes of data.

The bidirectional buffer 37 passes data from the CPU 31 to the DRAM array 47 via the buffer 37 during store operations and passes data from the DRAM array 47 to the CPU 31 via the buffer 37 during fetch operations.

Figure 14A:
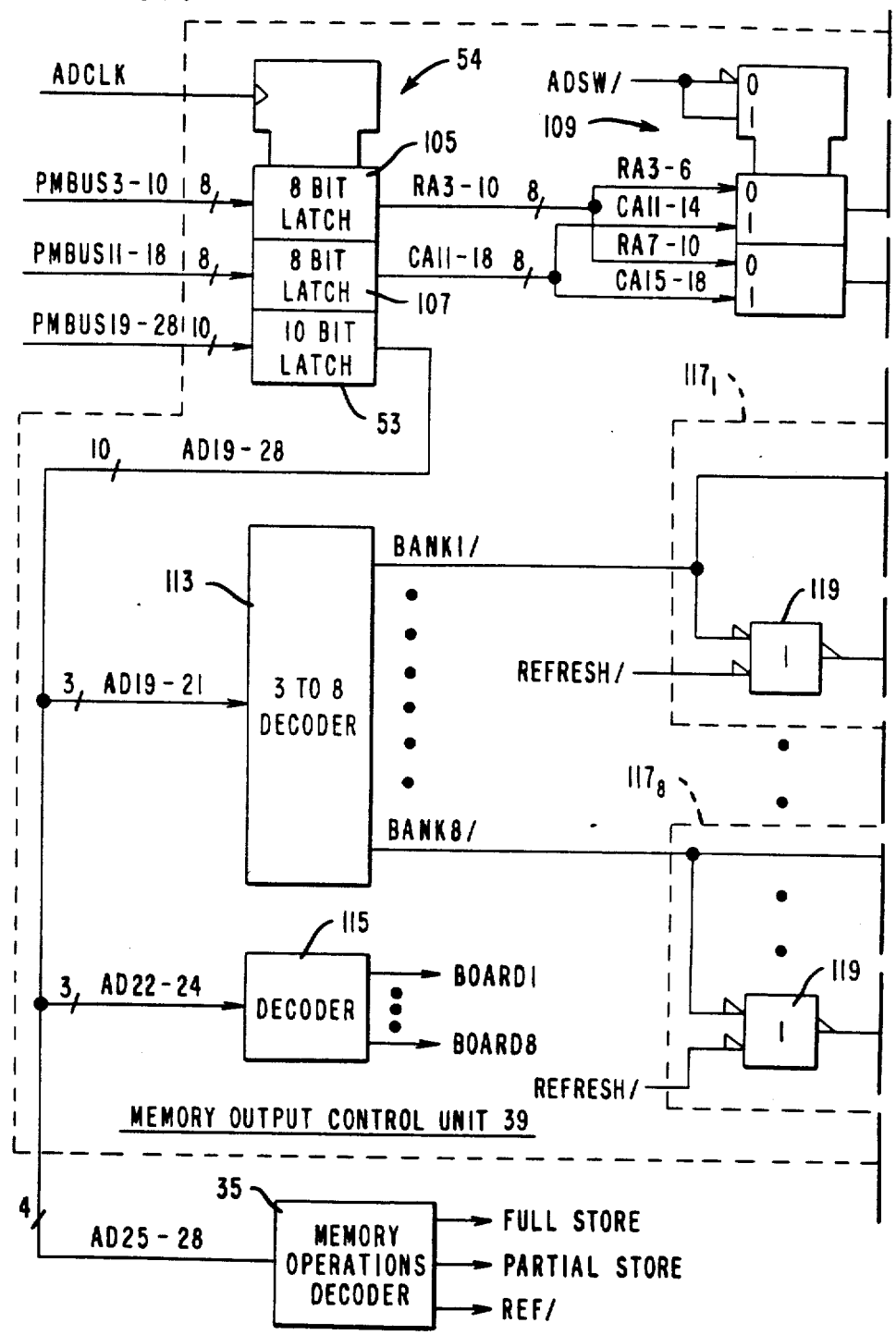
FIG. 14, which is comprised of FIGS. 14A and 14B, is a schematic block diagram of the memory operations decoder and memory output control unit of FIG. 3.

Referring briefly to FIG. 14A, the memory operations decoder 35 will now be discussed.

A 10-bit latch 53 in a latching circuit 54 of the memory output control unit 39 receives inputs from the CPU 31 via bus lines PMBUS 19–28 of the PM bus 41. At the time of an address clock ADCLK (to be explained), address signals on the bus lines PMBUS 19–28 are latched into latch 53.

Latched address signals from the bus lines PMBUS 25–28 are outputted from the latch 53 and applied as address signals AD 25-28 to the memory operations decoder 35. The signals AD 25-28 form a four-bit code which is decoded by the decoder 35 to determine the type of operation that is to be performed. For purposes of this invention, only three mutually-exclusive outputs of the decoder 35 are used. These outputs are the FULL STORE (FSTORE/), PARTIAL STORE (PSTORE) and refresh (REF/). Only one of these three outputs can be active at any given time. When FSTORE/ is active (low), a full store (either real or virtual) memory operation is to be performed. Similarly, when PSTORE is active (high), a partial store (either real or virtual) memory operation is to be performed. The REF/ signal is selectively activated (or made low) by the CPU 31 in order to refresh, one row at a time, all of the rows of memory in the DRAM array 47 (FIG. 3). Finally, when FSTORE/, PSTORE and REF/ are all inactive and the CPU 31 generates either an active (high) MAE signal or an active (low) PVT/ signal, a fetch (either real or virtual) memory operation is to be performed.

Referring back to FIG. 3, a brief description of the operation of the system of FIG. 3 will now be given for each of the six memory operations.

3-CYCLE REAL FETCH OPERATION

At clock X0 of cycle 1 the CPU 31 activates the MAE signal. This MAE signal is sent to the memory state generator 43 to start the memory operation and is also sent to the ATU 33 to indicate to the ATU 33 that a real memory operation is to be performed. This is due to the fact that the data which is to be fetched from the DRAM array 47 does not go directly to the CPU 31, but rather it goes to the ATU 33 first. Also, at clock X0 of cycle 1, a fetch CODE is sent from the CPU 31 to the memory operations decoder 35 to indicate that a fetch operation is to be performed, and the real address is sent from the CPU 31 to the DRAM array 47 via the memory output control unit 39. During clock X0 of cycle 3, data from the DRAM 47 goes to the ATU 33 via the bidirectional buffer 37. At clock X1 of cycle 3 the ATU 33 checks the data and then sends the correct data to the CPU 31, before the real fetch memory operation is terminated at the end of cycle 3.

3-CYCLE VIRTUAL FETCH OPERATION

At clock X0 of the first cycle, the CPU 31 activates the PVT/ signal and sends it to the ATU 33 and to the memory state generator 43 to tell those units that a virtual memory operation is to be performed. Also, during clock X0 of cycle 1, the CPU 31 sends the virtual address (including a fetch CODE) to the ATU 33. The ATU 33 checks the virtual address and translates it into a real address during clock X1 of cycle 1. At clock X0 of cycle 2, the ATU 33 outputs the real address to the DRAM 47 via the memory output control unit 39, and keeps outputting that real address through the X1 clock of cycle 2. Also, during clock X0 of cycle 2, the ATU 33 activates MAE and sends it to the memory state generator 43. This tells the generator 43 that the virtual address has been translated into the real address and that the real address is being outputted to the memory output control unit 39. The fetch CODE is also sent from the ATU 33 to the decoder 35 to indicate that a fetch operation is to be performed. At clock X0 of cycle 3, the DRAM 47 sends the data being fetched to the ATU 33 via the bidirectional buffer 37. During clock X1 of cycle 3, the ATU 33 checks the fetched data and then sends it to the CPU 31. The virtual fetch operation ends at the end of cycle 3.

2-CYCLE REAL FULL STORE OPERATION

During clock X0 of cycle 1, the CPU 31 activates MAE and sends it to the ATU 33 and to the generator 43 to start the real memory operation. Also during clock X0 of cycle 1, the CPU 31 sends the real address to the DRAM 47 via the control unit 39 and also sends a full store CODE to the decoder 35. During clock X1 of cycle 1, the CPU 31 sends the data to be stored to the ATU 33. At clock X0 of cycle 2, the ATU 33 sends the data by way of the bidirectional buffer 37 to the DRAM 47 for storage therein. The ATU 33 keeps outputting that data through the end of cycle 2, so that the data is stable at the time during cycle 2 when it is written into the DRAM 47 by a WE/ (write enable) pulse. The real full store operation ends at the end of cycle 2.

3-CYCLE VIRTUAL FULL STORE OPERATION

At clock X0 of cycle 1, the CPU 31 activates PVT/ and outputs the virtual address (including the full store CODE) to the ATU 33. During clock X1 of cycle 1, the CPU 31 outputs the data to the ATU 33, and the ATU 33 translates the virtual address into a real address. During clock X0 of cycle 2, the ATU 33 activates MAE to indicate that the address translation is completed, and sends the full store CODE to the decoder 35 and also sends the real address to the DRAM 47 by way of the memory output control unit 39. During clock X1 of cycle 2, the ATU 33 outputs the data to be stored to the DRAM 47 via the bidirectional buffer 37. The ATU 33 then keeps that data active until the virtual full store operation ends at the end of cycle 3. After the data has stabilized during cycle 3, it is written into the DRAM 47 by a WE/ pulse. The virtual full store operation ends at the end of cycle 3.

4-CYCLE REAL PARTIAL STORE OPERATION

During clock X0 of cycle 1, CPU 31 activates MAE and outputs the real address (including the partial store CODE) to the ATU 33 and also to the DRAM 47 via the control unit 39. Also, during clock X0 of cycle 1, the CPU 31 tells the ATU 33, via a 2-bit code on bus lines PMBUS 25-28 (FIG. 3), which byte (of the four bytes to be later placed on PM bus 39) is to be modified. By using a decoder (not shown) similar to the decoder 35, the ATU 33 decodes the 2-bit code on bus lines PMBUS 25-28 to find out what byte is to be modified. CPU 31 keeps outputting the real address through the end of cycle 2. During clock X1 of cycle 1, the CPU 31 sends the modified byte of data to the ATU 33. At clock X0 in cycle 3, the DRAM 47 sends the addressed four bytes of data to the ATU 33 via the bidirectional buffer 37 to enable the ATU 33 to modify the previously specified byte in that four bytes of data in accordance with the modified byte of data previously received from the CPU 31. At clock X1 in cycle 3, the ATU 33 sends the four bytes of modified data to the DRAM 47 by way of the bidirectional buffer 37. The ATU 33 keeps outputting that data through the end of cycle 4. As a result, that data is stable, at the time of clock X0 in cycle 4, when it is written into the DRAM 47 by a WE/ pulse. The real partial store operation ends at the end of cycle 4.

4-CYCLE VIRTUAL PARTIAL STORE OPERATION

At clock X0 in cycle 1, the CPU 31 activates PVT/ and outputs the virtual address to the ATU 33. In addition, the CPU 31 sends to the ATU 33 over bus lines PMBUS 25-28 the partial store CODE and the 2-bit code indicative of which byte of four bytes of data is to be modified. As mentioned before the ATU 33 includes a decoder (not shown) similar to the decoder 35 to decode the partial store CODE and to find out which byte is to be modified. During clock X1 of cycle 1, the CPU 31 sends out the modified byte of data to the ATU 33, and the ATU 33 translates the virtual address to a real address. At clock X0 of cycle 2, the ATU 33 activates MAE to indicate that the address translation is completed, sends the partial store CODE to the decoder 35 and outputs the real address to the DRAM 47 via the control unit 39. The ATU 33 keeps outputting that real address until the end of cycle 4. During clock X0 of cycle 3, the DRAM 47 sends the addressed four bytes of data to the ATU 33 via the bidirectional buffer 37. The ATU 33 then modifies the previously specified byte in that four bytes of data in accordance with the modified byte of data previously received from the CPU 31. At clock X1 in cycle 3, the ATU 33 outputs the four bytes of modified data to the DRAM 47 via the bidirectional buffer 37. The ATU 33 keeps outputting that data through the end of cycle 4. Consequently, that data is stable when, at the time of clock X0 in cycle 4, it is written into the DRAM 47 by a WE/ pulse. This virtual partial store operation ends at the end of cycle 4.

Before describing in detail the operation of the memory state generator 43 of FIG. 3, it will be helpful to first explain the state diagram, illustrated in FIG. 4, for the memory operations used in the system of FIG. 3. As shown in FIG. 4, a total of five different states are used by the memory state generator 43 to selectively cause the six previously mentioned memory operations to be performed. These states are the A, B, C, D and E states. All memory operations start in the idle or A state and are moved from that A state to the next state by the generation by the CPU 31 of either the MAE signal for a real memory operation or the PVT/ signal for a virtual memory operation. A transition from one state to another state occurs in one cycle of memory operation.

STATE FLOW FOR A REAL FETCH (RF) OPERATION

For a real fetch (RF) memory operation, the memory state generator 43 sequentially moves from state A to state D, to state E and back to state A in three cycles of memory operation. The movement from state A to state D occurs during the first cycle of the real fetch operation after MAE goes active (high), as long as this operation is not a real partial store (RPS) operation. Therefore, PSTORE must be inactive when MAE is active. Since it is a real fetch (RF) operation, both FSTORE/ and PSTORE (from decoder 35) are inactive. As a result, the memory state generator 43 moves from state D to state E during the second cycle of this RF operation, and from state E back to state A during the third cycle of this RF operation.

STATE FLOW FOR A VIRTUAL FETCH (VF) OPERATION

For a virtual fetch (VF) memory operation, the state generator 43 sequentially moves from state A to state B, to state D and back to state A in three cycles of memory operation. The movement from state A to state B occurs during the first cycle of the virtual fetch operation after PVT/ goes active (low). Since this is a virtual fetch operation, both of the PSTORE and FSTORE/ signals (from the decoder 35) are inactive. The movement from state B to state D occurs during the second cycle after MAE goes high. The state generator 43 then moves from state D back to state A during the third cycle of this VF operation.

STATE FLOW FOR A REAL FULL STORE (RFS) OPERATION

For a real full store (RFS) memory operation, the state generator 43 sequentially moves from state A to state D and then back to state A in two cycles of memory operation. Since this RFS operation is not a real partial store (RPS) operation, the movement from state A to state D occurs during the first cycle of this RFS operation after both MAE and FSTORE/ (from decoder 35) go active. Therefore, PSTORE (from decoder 35) must be inactive when MAE is active. During the second cycle of this RFS operation, the state generator 43 moves from state D back to state A.

STATE FLOW FOR A VIRTUAL FULL STORE (VFS) OPERATION

For a virtual full store (VFS) memory operation, the memory state generator 43 sequentially moves from state A to state B, to state D and back to state A in three cycles of memory operation. The movement from state A to state B occurs during the first cycle of this VFS operation after PVT/ goes active (low). The movement from state B to state D occurs during the second cycle of this VFS operation after both MAE and FSTORE/ go active. The state generator 43 then moves from state D back to state A during the third cycle of operation.

STATE FLOW FOR A REAL PARTIAL STORE (RPS) OPERATION

For a real partial store (RPS) memory operation, the state generator 43 sequentially moves from state A to state C, to state D, to state E and back to state A in four cycles of memory operation. The movement from state A to state C occurs during the first cycle of the real partial store operation, after both MAE and PSTORE go active (high). As a result, the memory state generator 43 moves from state C to state D during the second cycle of operation, from state D to state E during the third cycle of operation, and from state E back to state A during the fourth cycle of this RPS operation.

STATE FLOW FOR A VIRTUAL PARTIAL STORE (VPS) OPERATION

For a virtual partial store (VPS) memory operation, the state generator 43 sequentially moves from state A to state B, to state C, to state D and back to state A in four cycles of memory operation. The movement from state A to state B occurs during the first cycle of the virtual partial store operation, when PVT/ goes active (low). The movement from state B to state C occurs during the second cycle of the virtual partial store operation, when both MAE and PSTORE go active (high). The memory state generator 43 then moves from state C to state D during the third cycle of operation and from state D back to state A during the fourth cycle of operation.

Figure 1:
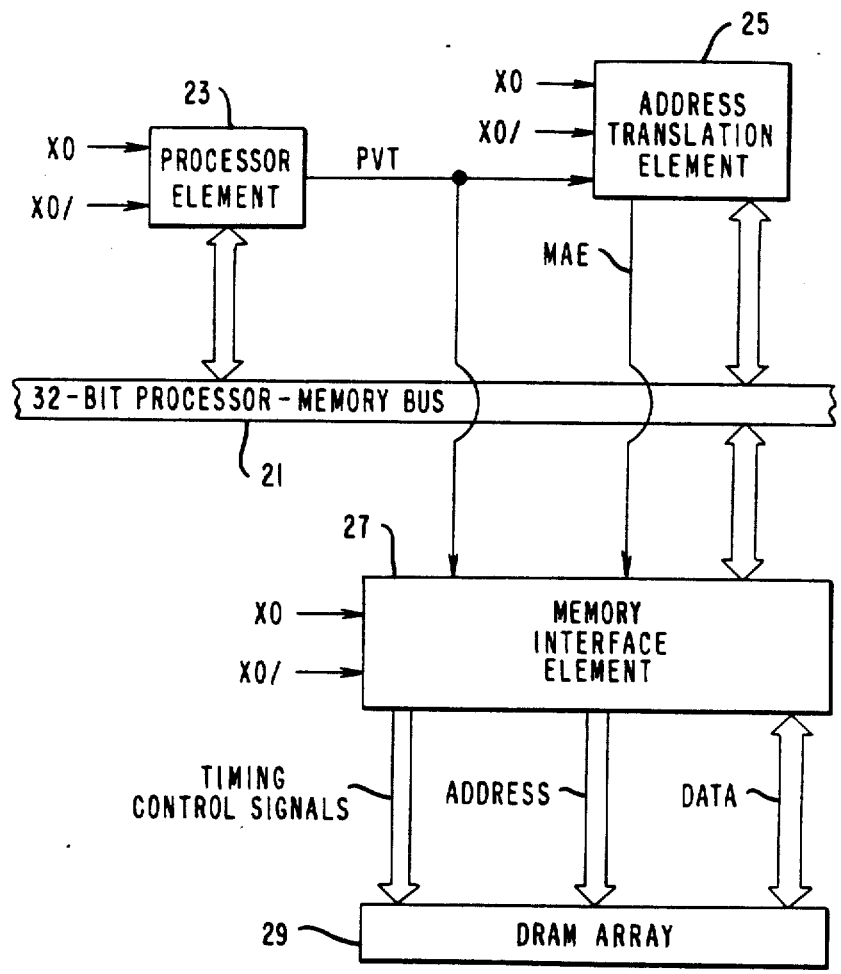
FIG. 1 is a schematic block diagram of the prior art address translation apparatus of U.S. Pat. No. 4,513,371.
Figures 2, 5:
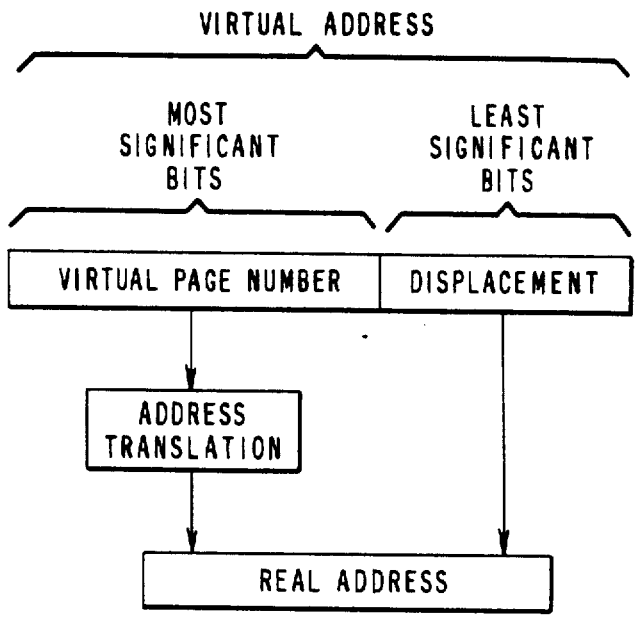
FIG. 2 is a prior art functional diagram useful in explaining the operation of the apparatus of FIG. 1.
FIG. 5 is a TABLE for comparing the present invention with the prior art in relation to the number of cycles required to perform various real and virtual memory operations.

Referring now to FIG. 5, a TABLE is shown of the comparison between the PRIOR ART and the system of the present invention (FIG. 3) in relation to the number of cycles required to perform the six abovementioned real and virtual memory operations. Note that the present invention of FIG. 3 requires one less cycle than the prior art to perform each of the virtual fetch and the virtual partial store memory operations. Thus, the system of the present invention can perform the virtual fetch and the virtual partial store memory operations within the same number of system cycles respectively required for performing the real fetch and the real partial store memory operations.

Figure 6:
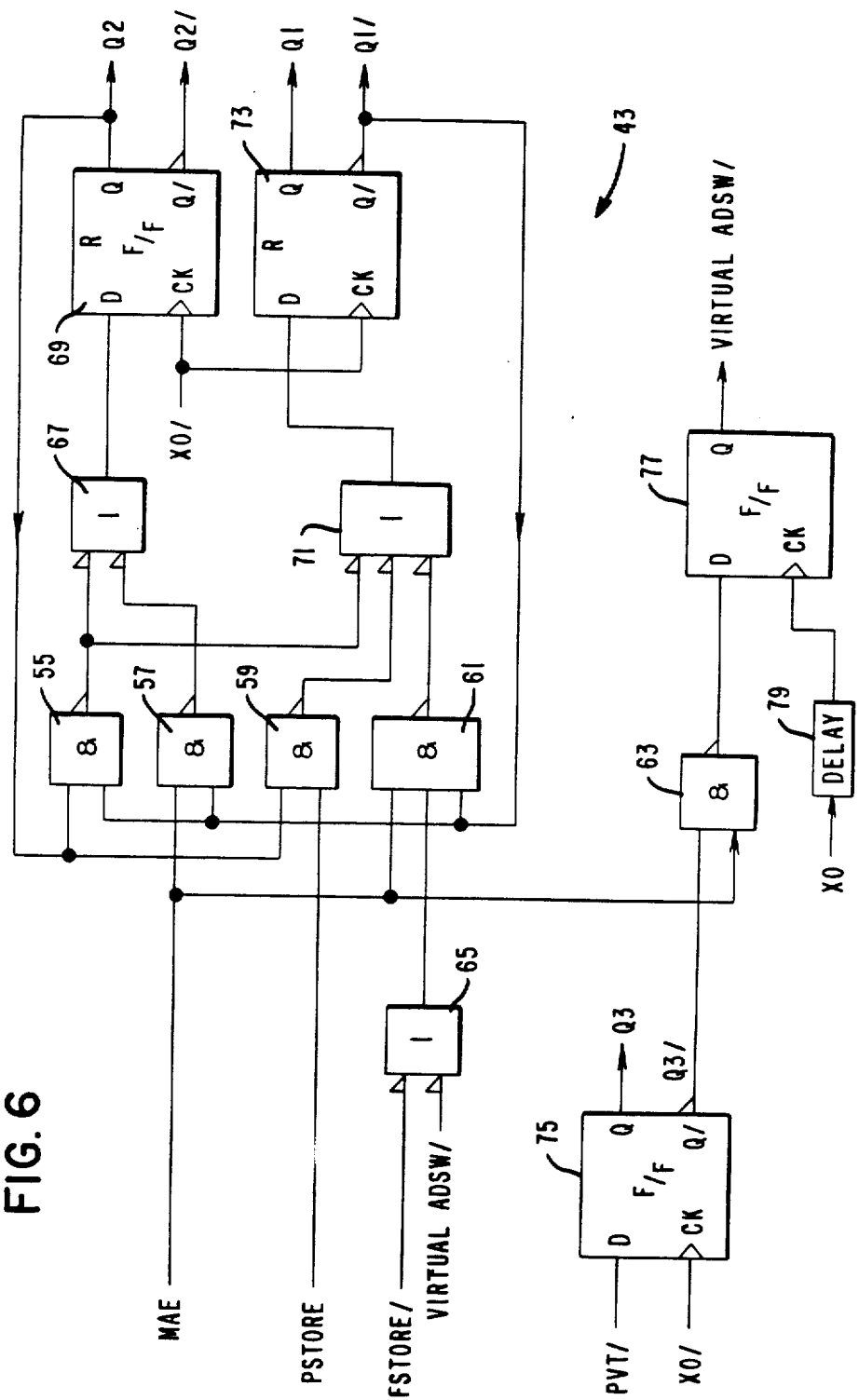
FIG. 6 is a schematic block diagram of the memory state generator of FIG. 3.

Referring to FIG. 6, the memory state generator 43 will now be discussed to explain how various sets of STATE SIGNALS are generated during each of the six memory operations. The memory state generator 43 develops Q1, Q1/, Q2, Q2/, Q3 and VIRTUAL ADSW/ output signals in response to the states of the MAE, PSTORE, FSTORE/, PVT/, X0 and X0/ input signals. It is the sequence of the states of these output signals that controls the operation of the memory timing control unit 45 (FIG. 3) and, hence, determines the memory operation to be performed. FIGS. 8-13 will also be referred to in explaining the operation of the memory state generator 43 of FIG. 6 during each of the six memory operations.

The output Q2 is fed back to upper inputs of NAND gates 55 and 59, while output Q1/ is fed back to lower inputs of NAND gates 55, 57 and 61. The input MAE is applied to upper inputs of NAND gates 57 and 61 and to a lower input of NAND gate 63, while the input PSTORE is applied to the lower input of NAND gate 59. Input FSTORE/ is applied to the upper input of NAND gate 65, while the VIRTUAL ADSW/ output signal is fed back to the lower input of NAND gate 65. The output of the NAND gate 65 is applied to a third input of NAND gate 61.

The outputs of NAND gates 55 and 57 are applied to inputs of NAND gate 67, which has its output applied to the D input of D-flip flop 69. The outputs of NAND gates 55, 59 and 61 are applied to the inputs of a NAND gate 71, which has its output applied to the D input of D-flip flop 73. Input PVT/ is applied to the D input of a D-flip flop 75. The flip flops 69, 73 and 75 are clocked by the X0/ clock from clock generator 51 (FIG. 3) to enable flip flop 69 to develop the Q2 and Q2/ outputs, flip flop 73 to develop the Q1 and Q1/ outputs and flip flop 75 to develop the Q3 output and its negation Q3/.

The Q3/ signal from flip flop 75 is applied to an upper input of the NAND gate 63, which has its output applied to the D input of D flip flop 77. A delay circuit 79 delays the X0 clock from the clock generator 51 (FIG. 3) to produce a delayed X0 clock. this delayed X0 clock is used to clock the flip flop 77 to enable the flip flop 77 to produce the VIRTUAL ADSW/ output signal. The delay introduced by the delay circuit 79 may be any suitable delay, such as 10-20 nanoseconds, which is sufficient to enable the flip flop 77 to avoid a race condition between the signal at its D-input and the clock at its clock input.

STATE A

Each of the six memory operations starts and ends in state A. It will be recalled that in state A, until at least the beginning of one of the memory operations, the MAE, PSTORE, FSTORE/ AND PVT/ input signals are all in their inactive states, with MAE and PSTORE being low and FSTORE/ and PVT/ being high.

It should be noted at this time that, on initial power up of the system of FIG. 3, flip flops 69 and 73 are reset (not shown) to respectively develop low Q2 and Q1 output signals in order to subsequently obtain the proper waveform states during each of the six memory operations.

Since MAE and Q2 are both low after initial power up, NAND gates 55, 57, 59 and 61 all develop high output signals which cause NAND gates 67 and 71 to apply low signals to the D-inputs of flip flops 69 and 73 to maintain the Q1 and Q2 outputs low at each X0 clock time during the idle state A. The high PVT/ signal causes flip flop 75 to develop a high Q3 output signal and a low Q3/ signal during idle state A. The low Q3/ signal causes NAND gate 63 to apply a high signal to the D-input of flip flop 77. As a result, flip flop 77 develops a high VIRTUAL ADSW/ output signal during state A.

Thus, during idle state A, the memory state generator 43 develops low Q1 and Q2 output signals and high Q1/, Q2/, Q3 and VIRTUAL ADSW/ output signals.

To better understand the sequential operation of the memory state generator 43, the states of the output signals of the memory state generator 43 will now be explained for each of the six memory operations.

REAL FETCH OPERATION OF GENERATOR 43

Figure 8:
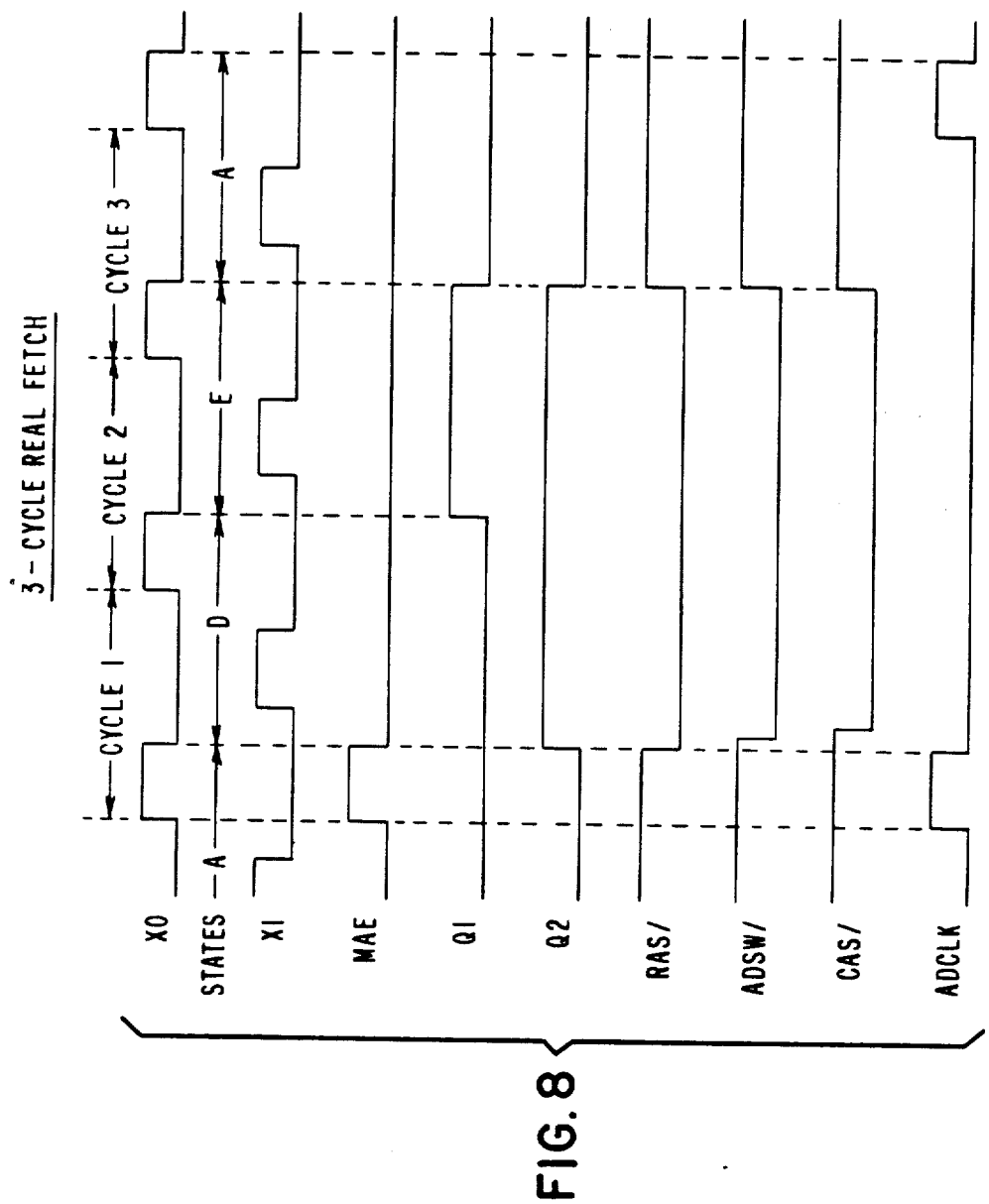
FIGS. 8-13 illustrate a plurality of sets of waveforms useful in explaining the various operational states needed to produce the memory operations shown in FIG. 4.

Referring to the waveforms of FIG. 8 in conjunction with the circuit of FIG. 6, cycle 1 of the real fetch operation starts when MAE goes high, causing NAND gate 57 to develop a low output. This low output from gate 57 causes NAND gate 67 to apply a high signal to the D-input of flip flop 69. Flip flop 69 is clocked by the rising edge of the next X0/ clock (at the time of the falling edge of the X0 clock in cycle 1), causing Q2 to go high to terminate state A and start state D during cycle 1. At this same time MAE goes low. The high Q2 causes the output of NAND gate 55 to go low, which causes NAND gate 67 to continue to develop and apply a high output to the D-input of flip flop 69 even though the now low MAE signal causes the NAND gate 57 output to go high. The now low output of NAND gate 55 also causes NAND gate 71 to apply a high output to the D-input of flip flop 73.

Flip flop 73 is clocked by the rising edge of the X0/ clock in cycle 2, causing Q1 to go high to terminate state D and state E. A resultant low Q1/ and the low PSTORE signal cause NAND gates 55, 57, 59 and 61 to all develop high outputs which, in turn, cause NAND gates 67 and 71 to apply low signals to the D-inputs of flip flops 69 and 73. Flip flop 69 and 73 are both clocked by the rising edge of the X0/ clock in cycle 3, causing both Q1 and Q2 to go low to return the generator 43 to idle state A.

VIRTUAL FETCH OPERATION OF GENERATOR 43

Figure 9:
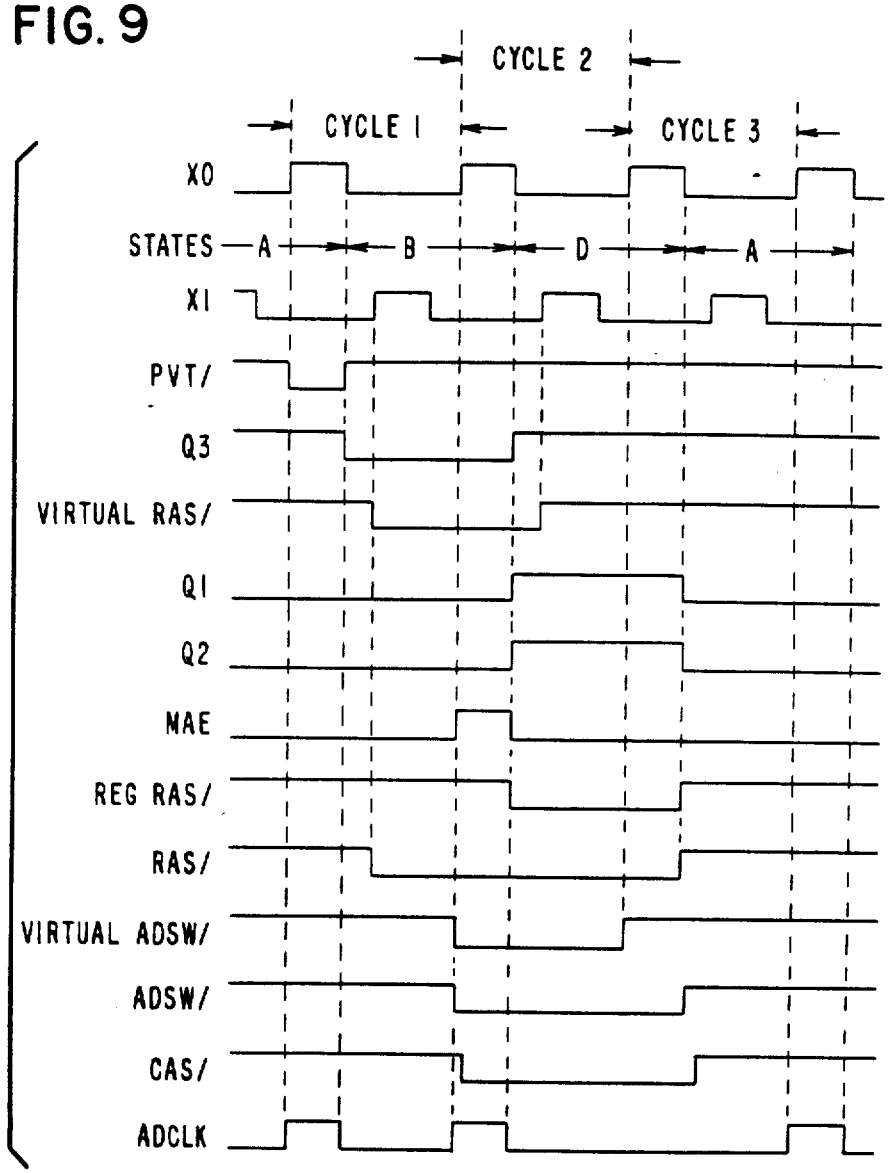

Referring to the waveforms of FIG. 9 in conjunction with the circuit of FIG. 6, cycle 1 of the virtual fetch operation starts when the PVT/ signal to the D-input of flip flop 75 goes low. Flip flop 75 is clocked by the rising edge of the X0/ clock in cycle 1, causing output Q3 to go low because PVT/ was low just prior to this time. At this same time PVT/ goes high. The Q1 and Q2 output signals remain low. At the time that Q3 goes low, state A ends and state B begins. When Q3 goes low, Q3/ goes high. This high Q3/ signal is applied to NAND gate 63. However, since the low MAE signal is also applied to the NAND gate 63 at this time, gate 63 continues to apply a high signal to the D-input of flip flop 73.

After the address translation in ATU 33 is complete, the ATU 33 causes MAE to go high. The high MAE and Q3/ signals cause NAND gate 63 to apply a low signal to the D-input of flip flop 77. The rising edge of the X0 clock in cycle 2, which clock is delayed by delay 79, clocks the flip flop 77 to develop a low VIRTUAL ADSW/ signal. This low VIRTUAL ADSW/ signal causes NAND gate 65 to develop a high output signal. Since MAE, Q1/ and the output of NAND gate 65 are all high signals, NAND gates 57 and 61 develop low outputs. The low output from NAND gate 57 causes NAND gate 67 to apply a high signal to the D-input of flip flop 69. At the same time, the low output from NAND gate 61 causes NAND gate 71 to apply a high signal to the D-input of flip flop 73.

When MAE goes low, state B ends and state D starts. At the same time that MAE goes low, the rising edge of the X0/ clock in cycle 2 clocks flip flops 69 and 73 causing Q1 and Q2 to both go high (since the D-inputs of flip flops 69 and 73 were both high just prior to this time). When Q1 goes high, Q1/goes low. PSTORE is also low since it is a fetch operation. Since Q1/ and PSTORE are both low at this time, NAND gates 55, 57, 59 and 61 all develop high outputs which, in turn, cause NAND gate 67 and 71 to develop and apply low inputs to the D-inputs of flip flops 69 and 73. The low MAE signal also causes NAND gate 63 to apply a high signal to the D-input of flip flop 77.

The flip flop 77 is clocked by the rising edge of the X0 clock in cycle 3, which clock is delayed by delay circuit 79, causing the VIRTUAL ADSW/ to go high at the start of cycle 3. The rising edge of the X0/ clock in cycle 3 clocks flip flops 69 and 73, causing Q1 and Q2 to both go low to end state D and return to state A. As a result, gates 55, 57, 59 and 61 all continue to develop high outputs, causing gates 67 and 71 to continue to develop and apply low signals to the D-inputs of flip flops 69 and 73. Thus, these flip flop 69 and 73 continue to develop low Q1 and Q2 outputs until after the next active MAE OR PVT/ signal is generated to start another memory operation.

REAL FULL STORE OPERATION OF GENERATOR 43

Figure 10:
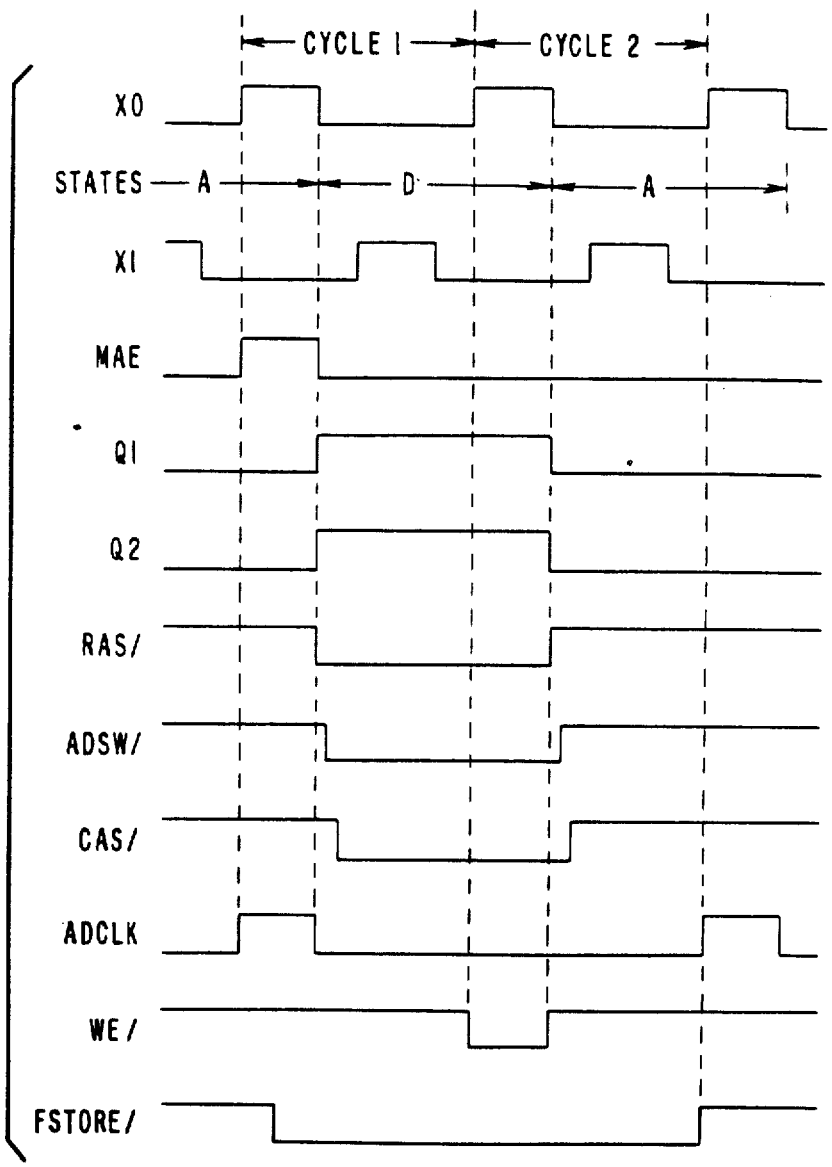

Referring to the waveforms of FIG. 10 in conjunction with the circuit of FIG. 6, since this is a real memory operation, PVT/ is high. This high PVT/ signal causes flip flop 75 to develop a high Q3 output signal and a low Q3/ signal during the real full store operation. The low Q3/ signal causes NAND gate 63 to continue applying a high signal to the D-input of flip flop 77. As a result, flip flop 77 develops a high VIRTUAL ADSW/ during the real full store operation.

Cycle 1 of the real full store operation starts when MAE goes high. Since the Q1/ and MAE inputs to NAND gate 57 are both high, the NAND gate 57 develops a low output. This low output from gate 57 causes NAND gate 67 to apply a high signal to the D-input of flip flop 69.

When the CPU 31 causes FSTORE/ to go low, MAE is still high. This low FSTORE/ signal causes NAND gate 65 to develop a high output. Since MAE, Q1/ and the output of the NAND gate 65 are all high signals at this time, NAND gates 57 and 61 develop low outputs. The low output from NAND gate 57 causes NAND gate 67 to apply a high signal to the D-input of flip flop 69. At the same time, the low output from NAND gate 61 causes NAND gate 71 to apply a high signal to the D-input of flip flop 73.

When MAE goes low, state A ends and state D begins. At the same time that MAE goes low, the rising edge of the X0/ clock in cycle 1 clocks flip flops 69 and 73, causing Q1 and Q2 to both go high (since the D-inputs of flip flops 69 and 73 were both high just prior to this time). When Q1 goes high, Q1/ goes low. PSTORE is also low at this time since this operation is not a partial store operation. Since Q1/ and PSTORE are both low, NAND gates 55, 57, 59 and 61 all develop high outputs which cause NAND gates 67 and 71 to develop and apply low signals to the D-inputs of flip flops 69 and 73.

The flip flops 69 and 73 are clocked by the rising edge of the X0/ clock in cycle 2, causing Q1 and Q2 to both go low to end state D and return the operation of the generator 43 to state A. As a result, the low MAE and Q1/ signals force the NAND gates 55, 57, 59 and 61 to continue to develop high outputs, causing NAND gates 67 and 71 to apply low signals to the D-inputs of flip flops 69 and 73. Thus, these flip flops 69 and 73 continue to develop low Q1 and Q2 outputs until after the next active MAE or PVT/ signal is generated to start another memory operation. CPU 31 causes the FSTORE/signal to go high at the end of cycle 2 in state A.

VIRTUAL FULL STORE OPERATION OF GENERATOR 43

Figure 11:
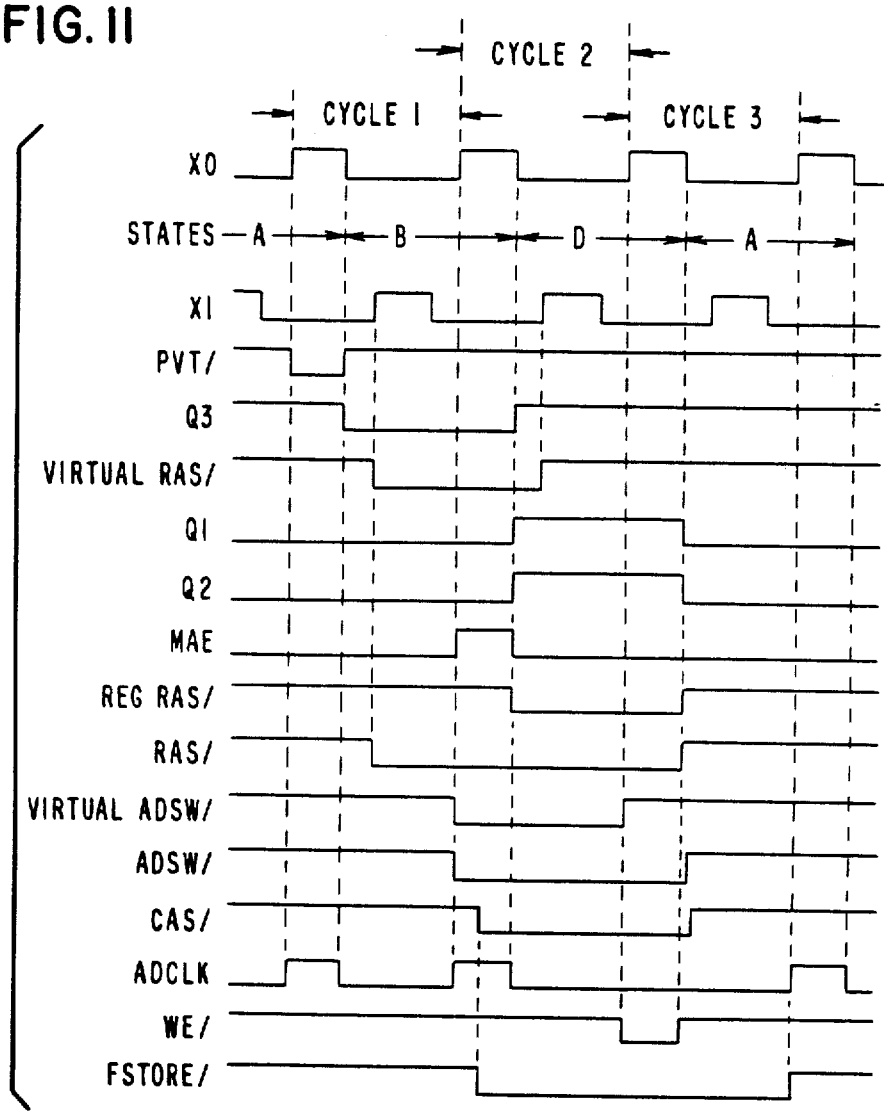

Referring to the waveforms of FIG. 11 in conjunction with the circuit of FIG. 6, cycle 1 of the virtual full store operation starts when the PVT/ signal to the D-input of flip flop 75 goes low. Flip flop 75 is clocked by the rising edge of the X0/ clock in cycle 1, causing output Q3 to go low because PVT/ was low just prior to this time. At this same time PVT/ goes high. The Q1 and Q2 output signals remain low. At the time that Q3 goes low, state A ends and state B begins. When Q3 goes low, Q3/ goes high. This high Q3/ signal is applied to NAND gate 63. However, since the low MAE signal is also applied to the NAND gate 63 at this time, gate 63 continues to apply a high signal to the D-input of flip flop 77.

After the ATU 33 has completed the address translation, it causes MAE to go high at the start of cycle 2. The high MAE and Q3/ signals cause NAND gate 63 to apply a low signal to the D-input of flip flop 77. The rising edge of the cycle 2 delayed X0 clock from delay circuit 79 clocks the flip flop 77 to develop a low VIRTUAL ADSW/ signal. This low VIRTUAL ADSW/ signal causes NAND gate 65 to develop a high output signal. Since MAE, Q1/ and the output of NAND gate 65 are all high signals, NAND gates 57 and 61 develop low outputs. The low output from NAND gate 57 causes NAND gate 67 to apply a high signal to the D-input of flip flop 69. At the same time, the low output from NAND gate 61 causes NAND gate 71 to apply a high signal to the D-input of flip flop 73.

When the CPU 31 causes FSTORE/ to go low in cycle 2, MAE is still high. This low FSTORE/ signal is applied to NAND gate 65. However, NAND gate 65 continues to output a low signal, since other input VIRTUAL ADSW/ went low at the start of cycle 2.

When MAE goes low, state B ends and state D starts. At the same time that MAE goes low, the rising edge of the X0/ clock in cycle 2 clocks flip flops 69 and 73, causing Q1 and Q2 to both go high (since the D-inputs of flip flops 69 and 73 were both high just prior to this time). When Q1 goes high, Q1/ goes low. PSTORE is also low at this time since this operation is not a partial store operation. Since Q1/ and PSTORE are both low, NAND gates 55, 57, 59 and 61 all develop high outputs which, in turn, causes NAND gates 67 and 71 to develop and apply low inputs to the D-inputs of flip flop9s 69 and 73. The low MAE signal also causes NAND gate 63 to apply a high signal to the D-input of flip flop 77.

The flip flop 77 is clocked by the rising edge of the X0 clock in cycle 3, which clock is delayed by delay circuit 79, causing the VIRTUAL ADSW/ signal to go high at the start of cycle 3. The rising edge of the X0/ clock in cycle 3 clocks flip flops 69 and 73, causing Q1 and Q2 to both go low to end state D and return the operation of the generator 43 to sate A. As a result, gates 55, 57, 59 and 61 all continue to develop high outputs, causing gates 67 and 71 to continue to apply low signals to the D-inputs of flip flops 69 and 73. Thus, these flop flops 69 and 73 continue to develop low Q1 and Q2 outputs until after the next active MAE or PVT/ signal is generated by CPU 31 to start another memory operation. CPU 31 causes FSTORE/ to go high at the end of cycle 3 in state A.

REAL PARTIAL STORE OPERATION OF GENERATOR 43

Figure 12:
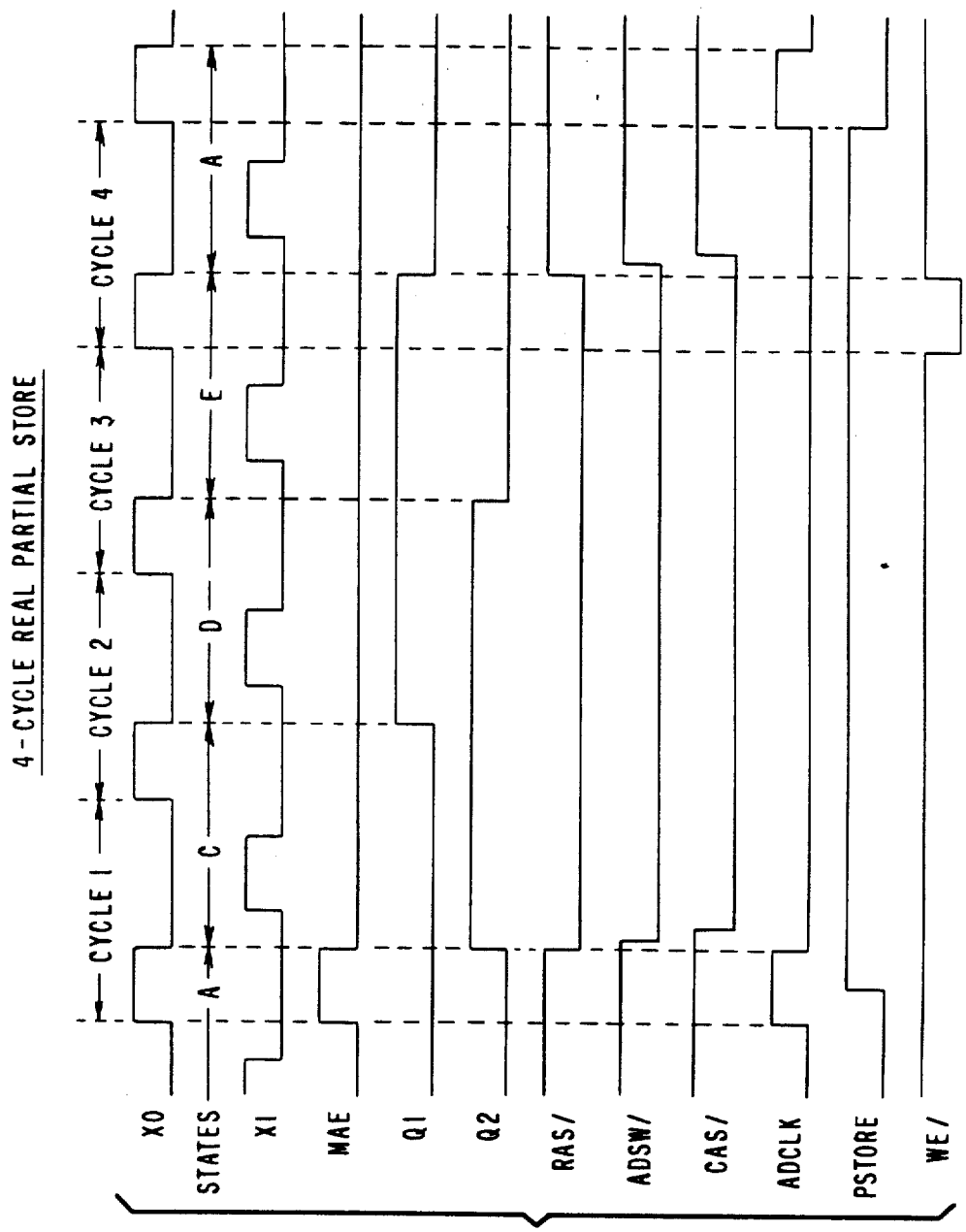

Referring to the waveforms of FIG. 12 in conjunction with the circuit of FIG. 6, since this is a real memory operation, PVT/ is high. This high PVT/ signal causes flip flop 75 to develop a high Q3 output signal and a low Q3/ signal during the real partial store operation. The low Q3/ signal causes NAND gate 63 to continue applying a high signal to the D-input of flip flop 77. As a result, flip flop 77 develops a high VIRTUAL ADSW/ signal during the real partial store operation.

Cycle 1 of the real partial store operation starts when MAE goes high, causing NAND gate 57 to develop a low output. This low output form NAND gate 57 causes NAND gate 67 to apply a high signal to the D-input of flip flop 69.

While MAE is still high, the CPU 31 causes PSTORE to go high. Since Q1/ and MAE are both high at this time, NAND gate 57 produces a low output which causes NAND gate 67 to apply a high signal to the D-input of flip flop 69.

When MAE goes low, state A ends and state C begins. At the same time that MAE goes low, the rising edge of the X0/ clock in cycle 1 clocks flip flop 69, causing Q2 to go high. Q2 goes high at this time because the D-input to flip flop 69 was high just prior to this time.

The high PSTORE and Q1/ signals and the now high Q2 signal cause NAND gates 55 and 59 to develop low output signals. These low output signals from gates 55 and 59 respectively cause NAND gates 67 and 71 to apply high signals to the D-inputs of flip flops 69 and 73, respectively.

The flip flops 69 and 73 are clocked by the rising edge of the X0/ clock in cycle 2, causing Q1 to go high and Q2 to remain high to end state C and start state D. When Q1 goes high, Q1/ goes low. The low Q1/ signal causes NAND gates 55 and 57 to develop high outputs which, in turn cause NAND gate 67 to apply a low signal to the D-input of flip flop 69. The high Q2 and PSTORE signals cause NAND gate 59 to develop a low otput signal, which causes NAND gate 71 to continue to apply a high signal to the D-input of flip flop 73.

Flip flops 69 and 73 are clocked by the rising edge of the X0/ clock in cycle 3, causing Q2 to go low and Q1 to remain high to end state D and start state E. The low Q2 and MAE signals cause all of NAND gates 55, 57, 59 and 61 to develop high outputs which cause NAND gates 67 and 71 to develop and apply low inputs to the D-inputs of flip flops 69 and 73.

The flip flops 69 and 73 are clocked by the rising edge of the X0/ clock in cycle 4, causing Q1 to go low and Q2 to remain low to end state E and return the operation of the memory state generator 43 to state A. At the end of cycle 4 the CPU 31 causes PSTORE to go low.

VIRTUAL PARTIAL STORE OPERATION OF GENERATOR 43

Figure 13:
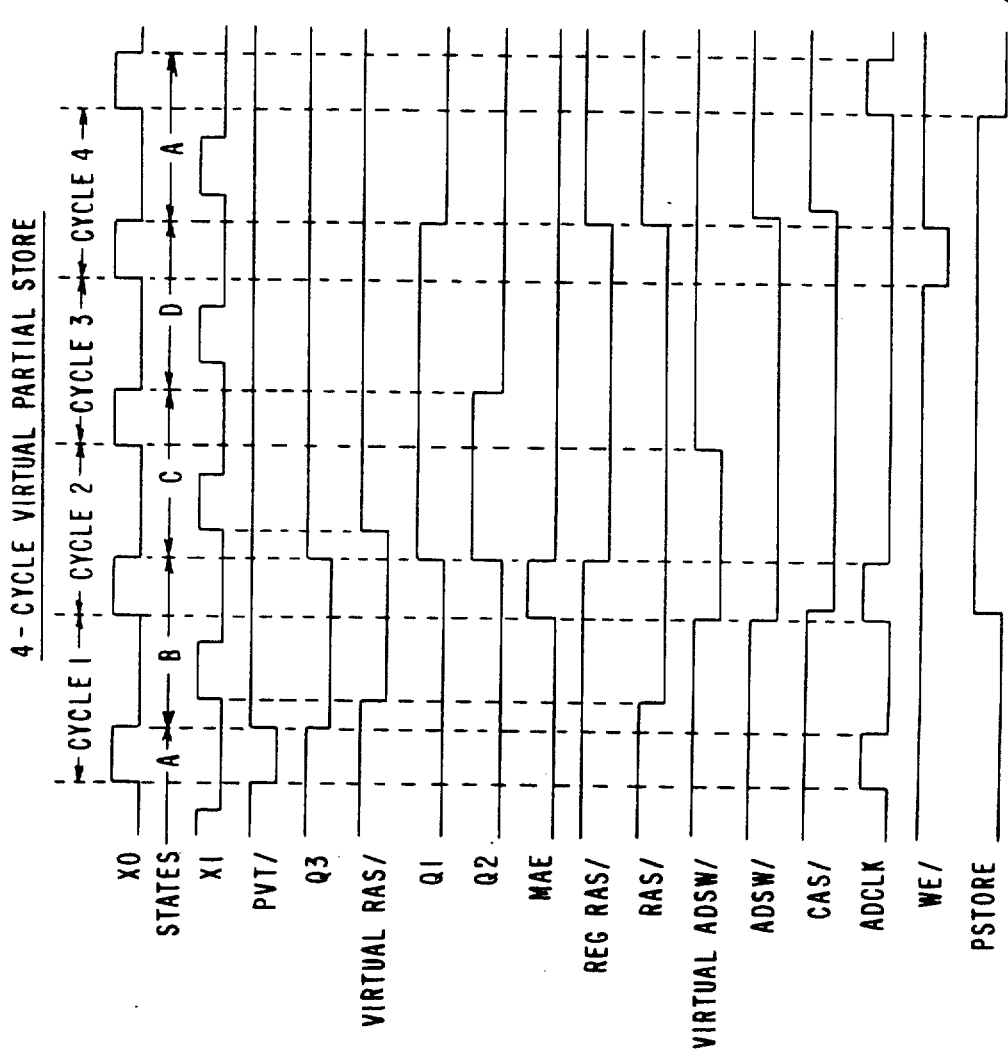

Referring to the waveform of FIG. 13 in conjunction with the circuit of FIG. 6, cycle 1 of the virtual partial store operation starts when the PVT/ signal to the D-input of flip flop 75 goes low. Flip flop 75 is clocked by the rising edge of the X0/ clock in cycle 1, causing output Q3 to go low because PVT/ was low just prior to this time. At this same time the PVT/ signal goes high. The Q1 and Q2 output signals remain low. At the time that Q3 goes low, state A ends and state B begins. Also, when Q3 goes low, Q3/ goes high. This high Q3/ signal is applied to NAND gate 63. However, since the low MAE signal is also applied to the NAND gate 63 at this time, gate 63 continues to apply a high signal to the D-input of flip flop 77.

After ATU 33 has translated the virtual address into a real address, it causes MAE to go high at the start of cycle 2. The high MAE and Q3/ signals cause NAND gate 63 to output a low signal to the D-input of flip flop 77. The rising edge of the cycle 2 delayed X0 clock from delay circuit 79 clocks the flip flop 77 to develop a low VIRTUAL ADSW/ signal. This low VIRTUAL ADSW/ signal causes NAND gate 65 to develop a high output signal. Since MAE, Q1/ and the output of NAND gate 65 are all high signals, NAND gates 57 and 61 develop low output signals. The low output signal from NAND gate 57 causes NAND gate 67 to apply a high signal to the D-input of flip flop 69. At the same time, the low output signal from NAND gate 61 causes NAND gate 71 to apply a high signal to the D-input of flip flop 73. While MAE is still high, the CPU 31 causes PSTORE to go high.

When MAE goes low, state B ends and state C begins. At the same time that MAE goes low, the rising edge of the X0/clock in cycle 2 clocks flip flops 69 and 73, causing Q1 and Q2 to both go high (since the D-inputs of flip flops 69 and 73 were both high just prior to this time). When Q1 goes high, Q1/ goes low. The low Q1/ signal causes NAND gates 55 and 57 to develop high outputs which cause NAND gate 67 to apply a low signal to the D-input of flip flop 69. The high Q2 and PSTORE signals cause NAND gate 59 to develop a low output signal, which causes NAND gate 71 to continue to apply a high signal to the D-input of flip flop 73.

Flip flops 69 and 73 are clocked by the rising edge of the X0/ clock in cycle 3, causing Q2 to go low and Q1 to remain high to end state C and begin state D. The low Q2 and MAE signals cause all of the NAND gates 55, 57, 59 and 61 to develop high output signals which, in turn, cause NAND gates 67 and 71 to develop and apply low inputs to the D-inputs of flip flops 69 and 73.

The flip flops 69 and 73 are clocked by the rising edge of the X0/ clock in cycle 4, causing Q1 to go low and Q2 to remain low to end state D and return the operation of the memory state generator 43 to state A. At the end of cycle 4 the CPU 31 causes PSTORE to go low.

Figure 7:
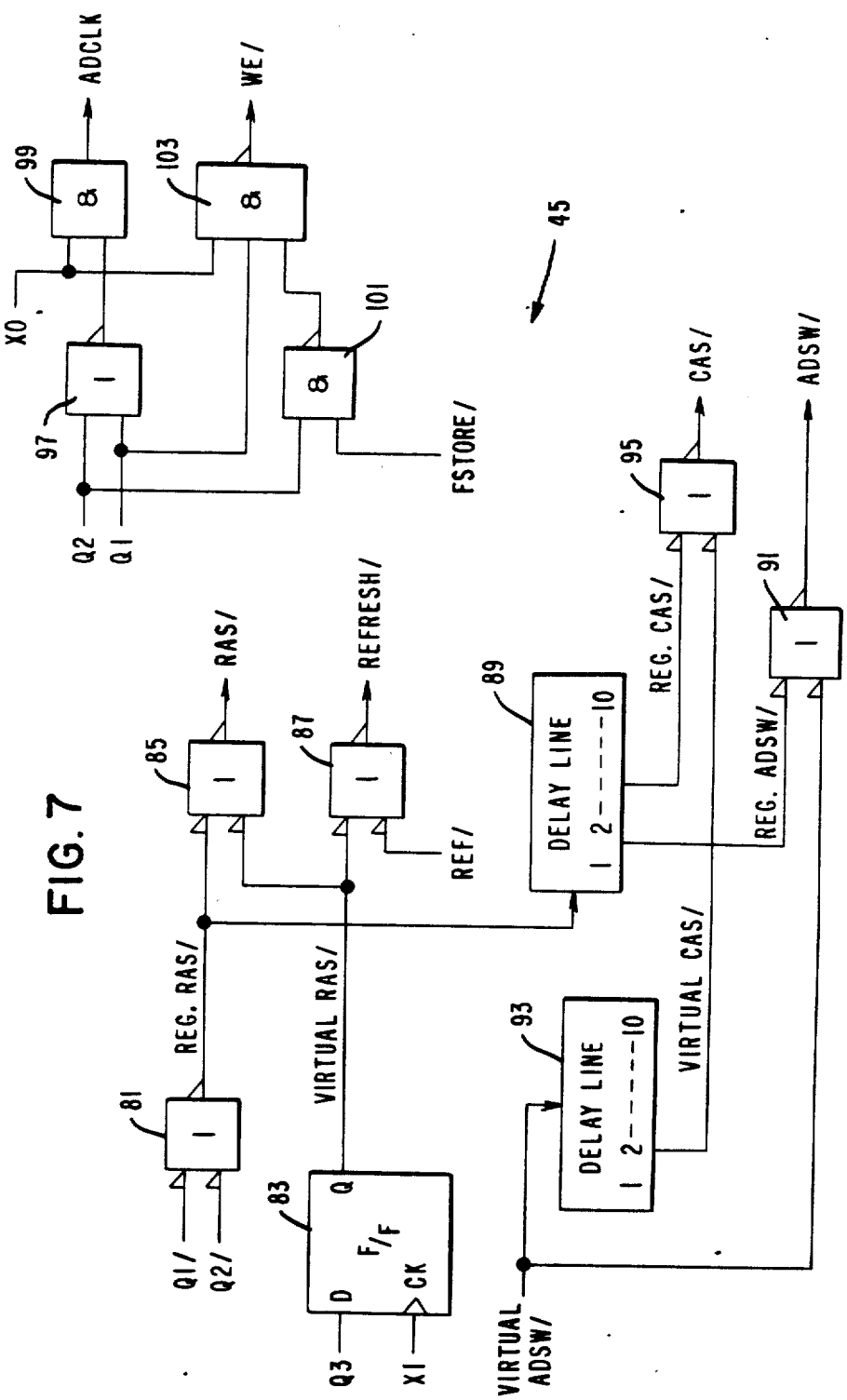
FIG. 7 is a schematic block diagram of the memory timing control unit of FIG. 3.

Referring to FIG. 7, the memory timing control unit 45 will now be discussed. FIGS. 8-13 will also be referred to in explaining the operation of the memory timing control unit of FIG. 7.

In response to the selective application of the signals; Q1, Q1/, Q2, Q2/, Q3 and VIRTUAL ADSW/ from the memory state generator 43 (FIG. 6), the X1 clock from the clock generator 51 (FIG. 3), the FSTORE/ signal from the memory operations decoder 35 (FIG. 14A), and a REF/ (periodic refresh) signal from the CPU 31 (FIG. 3), the memory timing control unit 45 selectively develops output control signals to control the operation of the memory output control unit 39 during the selected one of the six, above-discussed memory operations. The REF/ signal is periodically outputted from the CPU 31 to ultimately enable all of the rows in the DRAM array 47 (FIG. 3) to be refreshed to maintain the integrity of the data stored in the DRAM 47. Such refreshing of the DRAM 47 will be discussed later.

The output control signals developed by the memory timing control unit 45 are RAS/ (row address strobe), REFRESH/, ADSW/ (address strobe), CAS/ (column address strobe), ADCLK (address clock) and WE/ (write enable). How these output control signals of the control unit 45 are generated for the six memory operations will now be discussed.

RAS

Q1/ and Q2/ are applied to the inputs of an OR gate 81 to enable the gate 81 to develop a low REG. RAS/ signal whenever either Q1/ or Q2/ is low. The Q3 signal is applied to the D-input of a D-flip flop 83 which is clocked by the X1 clock to develop a VIRTUAL RAS/ signal. REG. RAS/ and VIRTUAL RAS/ are applied to an OR gate 85 to enable the gate 85 to develop a low RAS/ signal whenever either of the REG. RAS/ and VIRTUAL RAS/ signals is low.

During a real memory operation (real fetch, real full store or real partial store) Q3 is high, as discussed before. Thus, during a real memory operation, VIRTUAL RAS/ is high (inactive) and a low REG. RAS/ is outputted from OR gate 85 as the RAS/ signal shown in FIGS. 8, 10 and 12. During a virtual memory operation (virtual fetch, virtual full store or virtual partial store) Q3 goes low during state B. Thus, a low VIRTUAL RAS/ is developed by flip flop 83 during the time period between the rising edges of the X1 clocks in cycle 1 and cycle 2 of a virtual memory operation, as shown in FIGS. 9, 11 and 13. As a result, in a virtual memory operation RAS/ is low during the period between when VIRTUAL RAS/ goes low and when REG. RAS/ goes high, as shown in FIGS. 9, 11 and 13.

REFRESH/

The VIRTUAL RAS/ signal from flip flop 83 and the REF/ signal from CPU 31 are inputted to an OR gate 87 to enable the gate 87 to develop a low REFRESH/ signal whenever either of those input signals is low. During a real memory operation (when Q3 is high), REFRESH/ only goes low whenever the CPU 31 periodically generates a low REF/ signal (not shown) to refresh the DRAM 47. However, during a virtual memory operation, either a low VIRTUAL RAS/ or a low REF/ signal will cause OR gate 87 to develop a low REFRESH/ signal. The low VIRTUAL RAS/ signal is shown in FIGS. 9, 11 and 13, as discussed above.

ADSW/

The REG. RAS/ signal from OR gate 81 is applied to an input of a standard 50 nanosecond delay line 89 with 5 nanosecond taps to enable the delay line 89 to provide signals REG. ADSW/ and REG. CAS/ at its output taps 2 and 4, respectively. The REG. ADSW/ signal from tap 2 of delay line 89 and the VIRTUAL ADSW/ signal from flip flop 77 (FIG. 6) are applied to OR gate 91 to develop a low ADSW/ signal whenever either one of the inputs to gate 91 is low.

In a real memory operation the low ADSW/ signal is a delayed low RAS/ signal, as shown in FIGS. 8, 10 and 12, since VIRTUAL ADSW/ is high. As a result, RAS/ is the same as REG. RAS/. In a virtual memory operation a low ADSW/ signal, as shown in Figs. 9, 11 and 13, is developed by OR gate 81 during the time period between when the VIRTUAL ADSW/ signal goes low and when REG ADSW/ goes high. Since REG ADSW/ is a delayed version of REG. RAS/, REG. ADSW/ goes high approximately 10 nanoseconds after REG. RAS/ goes high.

CAS/

The VIRTUAL ADSW/ signal from flip flop 77 (FIG. 6) is applied to a standard 50 nanosecond delay line 93, similar to the delay line 89, to enable the delay line 93 to provide a VIRTUAL CAS/ signal at its output tap 2. The VIRTUAL CAS/ signal from delay line 93 and the REG. CAS/ signal from delay line 89 are applied to OR gate 95 to develop a low CAS/ signal whenever either one of the inputs to gate 95 is low.

In a real memory operation VIRTUAL CAS/ is high, since VIRTUAL ADSW/ is high. As a result, in a real memory operation AS/ is low whenever REG. CAS/ (which is a delayed REG. RAS/) is low, as shown in FIGS. 8, 10 and 12. As shown, RAS/ is the same as REG. RAS/. In a virtual memory operation a low CAS/ signal, as shown in FIGS. 9, 11 and 13, is developed by OR gate 95 during the time period between when VIRTUAL CAS/ goes low and when REG. CAS/ goes high. Since VIRTUAL CAS/ is a delayed version of VIRTUAL ADSW/, VIRTUAL CAS/ goes low approximately 10 nanoseconds after VIRTUAL ADSW/ goes low. Since REG. CAS/ is a delayed version of REG. RAS/, REG. CAS/ goes high approximately 20 nanoseconds after REG. RAS/ goes high. The VIRTUAL ADSW/ and REG. RAS/ waveforms are shown in FIGS. 9, 11 and 13.

The delayed signals produced from the VIRTUAL ADSW/ and REG. RAS/ signals are needed to allow for stabilization of signals for proper memory operation.

ADCLK

The Q1 and Q2 signals from the memory state generator 41 (FIG. 6) are applied to a NOR gate 97 which has its output connected to a first input of AND gate 99. The X0 clock is applied to a second input of AND gate 99. NOR gate 97 produces a high signal output whenever both Q1 and Q2 are low. Thus, AND gate 99 develops a high ADCLK whenever both Q1 and Q2 are low at the time of the X0 clock. Note that only one ADCLK is developed during each of the real memory operations whose waveforms are shown in FIGS. 8, 10, and 12, whereas two ADCLKs are developed during each of the virtual memory operations whose waveforms are shown in FIGS. 9, 11 and 13.

WE/

Q2 and FSTORE/ are applied as inputs to a NAND gate 101 which has its output signal applied to a first input of NAND gate 103. Q1 and X0 are applied to other inputs of NAND gate 103. Whenever the output of NAND gate 103 goes low, a WE/ signal is generated.

If either Q2 or FSTORE/ is low, the output of NAND gate 101 is high. Whenever the Q1 signal and the output of NAND gate 101 are both high when the X0 clock is high, the NAND gate 103 will produce a low WE/ signal, as shown in FIGS. 10-13.

Figure 14B:
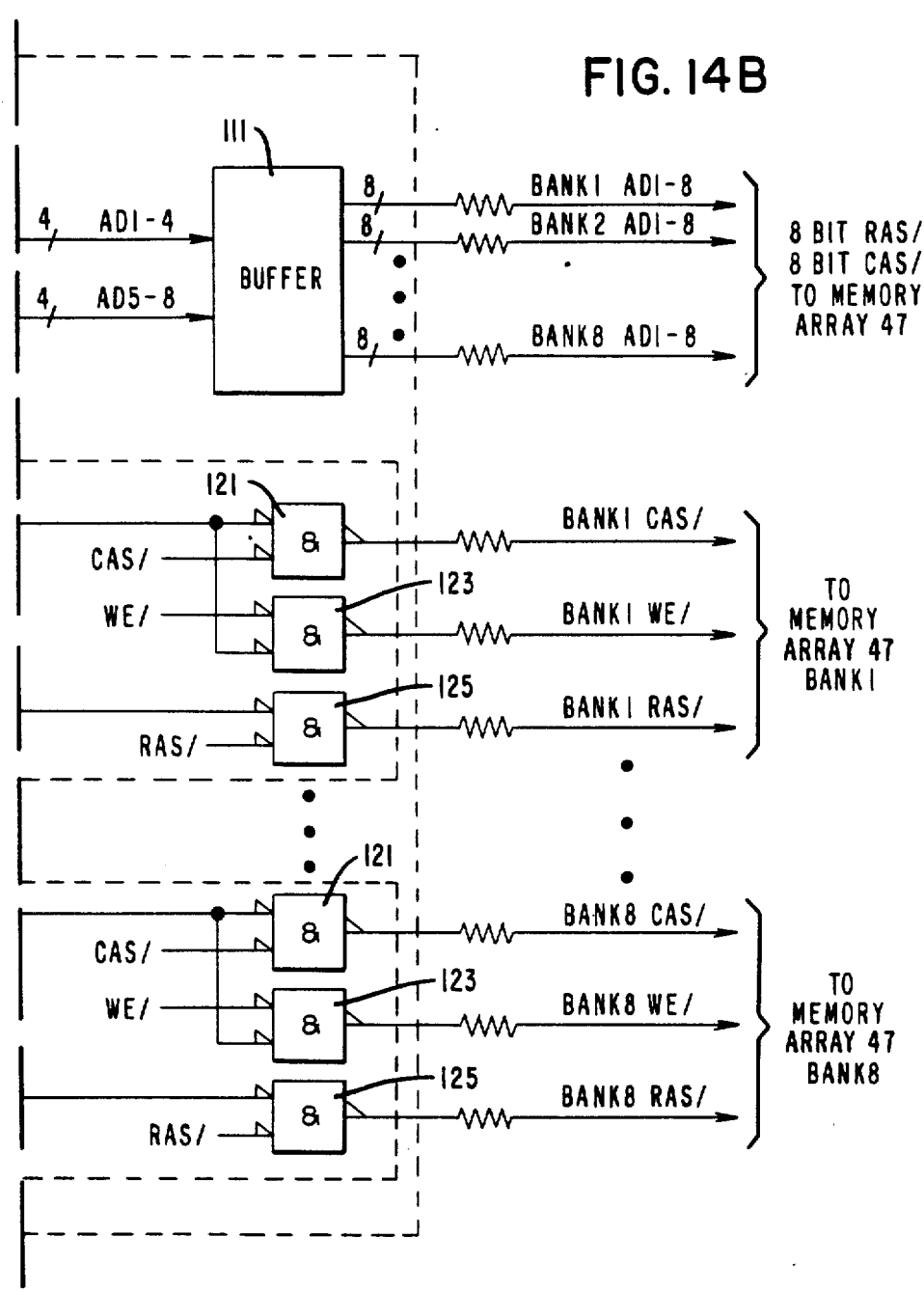

Referring to FIGS. 14A and 14B, the memory output control unit 39 will now be discussed. It should be noted at this time that the 64K byte DRAM array 47 (FIG. 3) has an 8-bit address input, but requires an 8-bit row address and an 8-bit column address to access data. As a result of such a requirement, a 16-bit address on bus lines PMBUS 3-18 is latched into the latching circuit 54 by the address clock ADCLK. More specifically, bus lines PMBUS 3-10 contain an 8-bit row address RA3-10 which is latched into an 8-bit latch 105 of the latching circuit 54, while bus lines PMBUS 11-18 contain an 8-bit column address CA 11-18 which is latched into an 8-bit latch 107 of the latching circuit 54.

The 8-bit row address RA 3-10 at the output of latch 105 and the 8-bit column address CA 11-18 at the output of latch 107 are applied to a 2:1 multiplexer 109. Multiplexer 109 consists of two conventional 4-bit 2:1 multiplexer circuits (SN74LS157). In response to the address switch signal ADSW/, the multiplexer 109 selects one of the input RA 3-10 and CA 11-18 addresses to be passed therethrough as its 8-bit output address AD 1-8. When ADSW/ is high, the multiplexer 109 selects RA 3-10 as its output address AD 1-8. Conversely, when ADSW/ is low, the multiplexer 109 selects CA 11-18 as its output address AD 1-8.

The output address AD 1-8 from multiplexer 109 is stored in a buffer 111 and, in turn, outputted therefrom and applied to each of the eight memory banks (BANKS 1-8) of the memory or DRAM array 47.

It should be recalled that address signals on bus lines PMBUS 19-28 are also latched into latch 53 by ADCLK. These signals are outputted from the latch 53 as address signals 19-28. Address signals AD 19-21 are decoded by decoder 113 to activate one of the eight bank select signals BANK1/ -BANK8/ to determine which one of eight memory banks is to be addressed. Address signals AD 22-24 are decoded by decoder 115 to activate one of the eight BOARD 1 -BOARD 8 signals to determine which one of eight printed circuit boards (not shown) is to be addressed. The address signals AD 25-28, as discussed before, are decoded by the memory operations decoder 35 to determine whether a full store, partial store, refresh (REF/) or fetch operation is to be performed.

As stated before, there are eight banks of memory in the DRAM array 47, with each bank storing 64K by 1 bits of memory. For packaging purposes these eight banks are implemented on only one of the eight different boards. Thus, for purposes of this description only one board is used. However, with a different type of DRAM array 47, additional boards may be added as needed.

The BANK1/ -BANK8/ outputs of the decoder 113 are respectively applied to gating circuits $117_1 117_8$. Each of these gating circuits $117_1$–$117_8$ also receives the REFRESH/, RAS/, CAS/ and WE/ signals from the memory timing control unit 45 (FIG. 7). The structure and operation of each of the gating circuits $117_1$–$117_8$ are the same as those of the rest of the gating circuits $117_1$–$117_8$. Therefore, only the gating circuit $117_1$ will now be explained.

The BANK1/ signal is applied to a first input of an OR gate 119 and to a first input of each of the AND gates 121 and 123. The output of OR gate 119 is applied to a first input of an AND gate 125. REFRESH/ is applied to a second input of OR gate 119. The CAS/, WE/, and RAS/ signals are respectively applied to second inputs of the AND gates 121, 123 and 125.

Whenever either BANK1/ or REFRESH/ is low, the OR gate 119 applies a low input to the first input of AND gate 125 to enable the gate 125 to pass a low RAS/ signal to BANK1 of the memory array 47. Note that, when BANK1/ is low and REFRESH/ is high, a low RAS/ signal will only be passed through the gate 125 of the gating circuit $117_1$ to only the row of BANK1 of the array 47 that is being addressed. However, whenever a low REFRESH/ signal is outputted from OR gate 87 (FIG. 7), that low REFRESH/ signal is passed through OR gate 119 of each of the gating circuits $117_1$–$117_8$ to enable the AND gate 125 of each of the gating circuits $117_1$–$117_8$. As a result, a low RAS/ signal will be passed through the enabled gate 125 of each of the gating circuits $117_1$–$117_8$ to refresh the same addressed row of all of the BANKs 1-8 (of all of the BOARDs 1-8 being used) in the memory array 47.

In addition, when the bank select signal BANK1/ goes low, only the gating circuit $117_1$ will be enabled to output a low CAS/ signal and, during a store operation, a low WE/ signal to its associated BANK1 of the memory array 47. This is due to the fact that CAS/ is ANDed with BANK1/ in gate 121 of only gating circuit $117_1$, while WE/ is ANDed with BANK1/ in gate 123 of only gating circuit $117_1$.

In the operation of the memory output control unit 39 of FIG. 14, it makes no difference whether the 16-bit address on bus lines PMBUS 3-18 is a real address or a virtual address. The DRAM array 47 will not use the virtual address (to be explained). The row address RA 3-10 will be used with either a real or virtual memory operation since, as mentioned before, RA 3-10 is a real address. However, if it is a virtual memory operation, the virtual column address will not be used. It will be recalled that for a virtual memory operation, the virtual address is translated into a real address during cycle 1 and outputted as a real address at the beginning of cycle 2. At this same time a MAE signal will be generated by the ATU 33 to indicate that the address translation has been completed and a second ADCLK will be generated. This second ADCLK, which is shown in FIGS. 9, 11 and 13, will cause the 16-bit real address on bus lines PMBUS 3-18 to be latched into the latch circuit 54 at that time.

For purposes of further clarity, the operation of the memory output control unit 39 will now be briefly explained for both real and virtual memory operations.

REAL MEMORY OPERATION

At the time that a real address is latched into the latching circuit 54 by ADCLK, the address switch ADSW/ is inactive (high). As a result, the row address RA 3-10 is passed through the multiplexer 109, stored in the buffer 111 and applied as the input address AD 1-8 to each of the BANKs 1-8 of the DRAM 47, as discussed before. This starts the RAS access portion of the access cycle of the DRAM 47. When RAS/ goes low, the address AD 1-8 (which is the row address) is strobed into the DRAM 47. Some time after RAS/ goes low (active), ADSW/ goes low (active) to cause the multiplexer 109 to pass the column address CA 11-18 into the buffer 111 as the input address AD 1-8 to the DRAM 47. The CAS/ signal is then activated to strobe the address AD 1-8 (which is now the column address) into the DRAM 47 to complete the CAS/ access portion of the access cycle of the DRAM 47. Data is then accessed to or from the DRAM 47 to perform the desired real memory operation.

VIRTUAL MEMORY OPERATION

Even though a virtual address is latched into the latching circuit 54 by ADCLK, the system will not use the virtual address. However the system will use the row address RA 3-10 portion of the virtual address, since this address is not changed during the address translation by the ATU 33. So it will be the same as the real row address. At the time that the virtual address is latched into latching circuit 54, the address switch ADSW/ is inactive. As a result, the row address RA 3-10 is passed through the multiplexer 109 into the buffer 111 and applied as the input address AD 1-8 to each of the BANKs 1-8 of the DRAM array 47 to start the RAS access portion of the access cycle of the DRAM 47. When RAS/ goes low, the address AD 108 (which is the row address) is strobed into the DRAM 47.

Upon completion of the translation of the virtual address by the ATU 33, the resultant real address is outputted from the ATU 33 at the start of cycle 2 and latched into the latching circuit 54 by the second ADCLK, as shown in each of FIGS. 9, 11 and 13. At the same time that ADCK is generated, ADSW/ goes active (low). Consequently the translated column address CA 11-18 is passed through the multiplexer 109 and applied as the input address AD 1-8 to each of the banks 1-8 of the DRAM 47 to complete the CAS access portion of the access cycle of the DRAM 47. The CAS/ signal is then activated to strobe the address AD 1-8 (which is now the column address) into the DRAM 47. Data is then accessed to or from the DRAM 47 to perform the desired virtual memory operation.

The invention thus provides a system which utilizes a memory state generator to generate an associated sequence of operational states for each one of various memory operations in order to save cycle time for various virtual look-ahead memory operations.

While the salient features of the invention have been illustrated and described, it should be readily apparent to those skilled in the art that many changes and modifications can be made in the system of the invention presented without departing from the spirit and true scope of the invention. Accordingly, the present invention should be considered as encompassing all such changes and modifications of the invention that fall within the broad scope of the invention as defined by the appended claims.

What is claimed is:

1. A data processing system comprising:
    a memory bus;
    processing means coupled to said memory bus for providing during a first cycle either a real address for a real memory operation or a first virtual address for a virtual memory operation, said real address including first, second and third real address portion, said first virtual address including said first real address portion and a second virtual address portion, said processing means further selectively providing first and second processor signals as a function of a desired one of a plurality of real and virtual memory operations to be performed by the data processing system;
    address translation means coupled to said processing means and said memory bus being responsive to said first processor signal and virtual address from the processing means via said memory bus for translating said second virtual address portion into said second and third real address portions during a first cycle, for, generating said second processor signal to a memory state generator and for forwarding said second and third real address portions to said memory bus during at least a second cycle;
    decoding means coupled to said memory bus for converting said third real address portion into memory operation signals that determine which one of said plurality of memory operations is to be performed by the data processing system;
    said memory state generator selectively responsive to said first and second processor signals and to said memory operation signals for selectively generating an associated predetermined set of state signals that determine the number of cycles required to perform a desired one of said plurality of real and virtual memory operations;
    memory timing control means responsive to said set of state signals for selectively generating a set of timing control signals;
    memory output control means selectively responsive to addresses said real address portions on said memory bus and to said set of control signals from said memory timing control means for buffering and selectively gating memory control signals and said first and second real address portions to initiate the selected one of said plurality of real and virtual memory operations;
    an addressable memory being selectively responsive to said set of memory control signals and said first and second real address portions for accessing desired data during the cycle time of the memory operation that is determined by said set of timing control signals; and
    output means coupled to said addressable memory and to said memory bus for passing accessed data therebetween.

2. The data processing system of claim 1 wherein said output means is a bidirectional buffer circuit.

3. The data processing system of claim 1 wherein said decoding means includes:
    storing means coupled to said memory bus for selectively storing said third real address portion; and
    a decoder coupled to said storing means for converting said third real address portion into said memory operation signals.

4. The data processing system of claim 3 wherein said addressable memory includes:
    at least one bank of addressable memory for storing pages of data addressable through real addresses.

5. The data processing system of claim 4 further including:
    a second decoder coupled to said storing means for converting a selected portion of said third real address into addressable memory bank select signals.

6. The data processing system of claim 1 wherein said memory state generator includes:
    first gating means responsive to input signals comprised of said first and second processor signal and said memory operation signals for developing a first signal and a set of logic signals which selectively vary as a function of said input signals;
    second gating means responsive to said set of logic signals for developing second and third signals; and
    a plurality of output circuits selectively responsive to said first, second and third signals for generating said set of state signals.

7. The data processing system of claim 1 wherein said memory output control means includes:
    first means for storing said first real address portion present on said memory bus during the first cycle;
    second means for storing said second real address portion present on said memory bus during the second cycle; and
    multiplexer means coupled to said first and second means being responsive to a first state of a first control signal from said memory timing control means for passing said first real address portion from said first means to said addressable memory to commence memory addressing during said first cycle and being responsive to a subsequent second state of said first control signal for passing said second real address portion from said second means to said addressable memory to complete the memory addressing.

* * * * *